United States Patent
Hashimura et al.

(10) Patent No.: US 6,191,902 B1
(45) Date of Patent: *Feb. 20, 2001

(54) MAGNETIC DISK APPARATUS AND MAGNETIC DISK MEDIUM

(75) Inventors: Yoshihiro Hashimura; Shuichi Hashimoto, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/925,007

(22) Filed: Aug. 27, 1997

(30) Foreign Application Priority Data

Mar. 4, 1997 (JP) .................................................. 9-048748

(51) Int. Cl.[7] ........................................................ G11B 5/09
(52) U.S. Cl. .............................................. 360/46; 360/48
(58) Field of Search .................................. 360/48, 51, 53, 360/25, 46

(56) References Cited

U.S. PATENT DOCUMENTS 5,790,487 * 8/1998 Moriya et al. .......................... 369/48
5,844,920 * 12/1998 Zook et al. ............................. 360/51
5,917,670 * 6/1999 Scaramuzzo et al. ................ 360/51

* cited by examiner

Primary Examiner—W. Chris Kim
(74) Attorney, Agent, or Firm—Greer, Burns & Crain, Ltd.

(57) ABSTRACT

A writing unit divides a sync byte into two sync bytes of a first sync byte and a second sync byte and also divides write data into two data of first data and second data and writes them. When a first sync byte pattern is detected, a reading unit demodulates the subsequent first data, second data, and an error detection correction code. When the first sync byte pattern SB1 is not detected but a second sync byte pattern SB2 is detected, the subsequent second data and error detection correction code are demodulated and the first data is reconstructed by the error detection correction code.

19 Claims, 26 Drawing Sheets

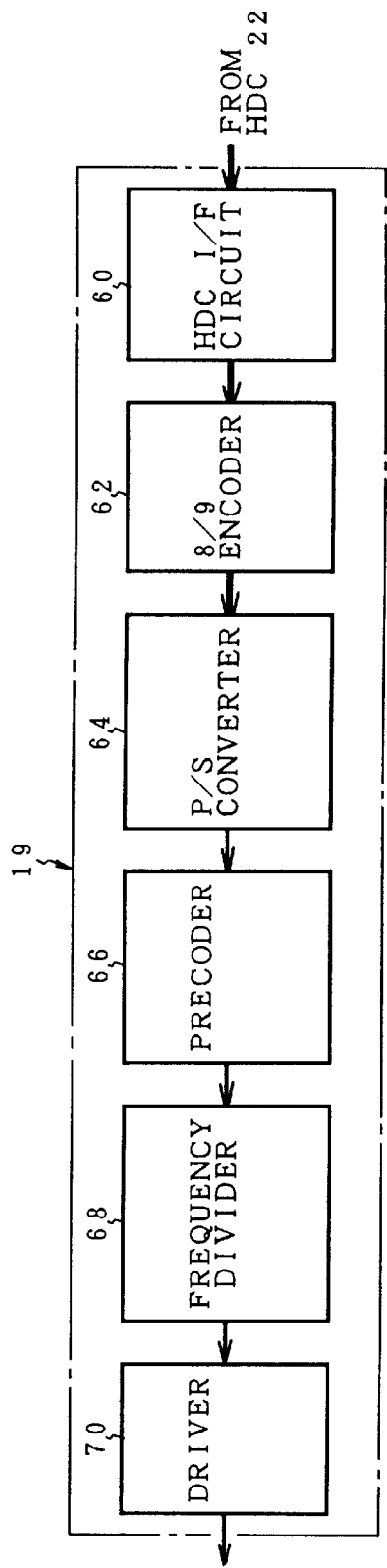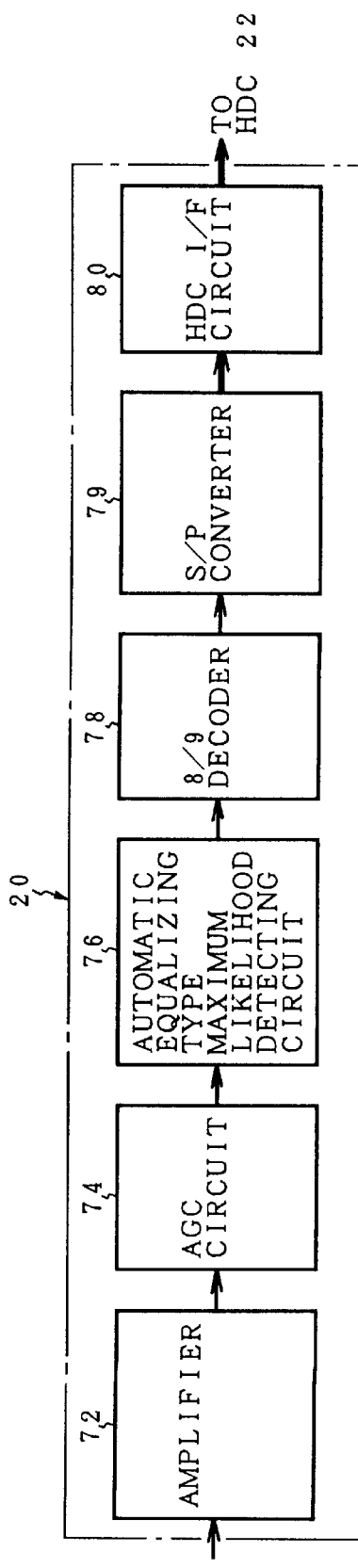

FIG. 3A WRITE GATE SIGNAL
FIG. 3B HDC DATA FORMAT
FIG. 3C MEDIUM DATA FORMAT

FIG. 4

| | | PLO 1 | TR 1 | SB 1 | DATA 1 | PLO 2 | TR 2 | SB 2 | DATA 2 ECC | GAP |
|---|---|---|---|---|---|---|---|---|---|---|
| PATTERN A | HDC IF | "00h" | "93h" | "1Fh" | "XXh" | "00h" | "93h" | "69h" | "XXh" | "00h" |
| | MEDIA | "1FFh" S/M | "133h" 8->9 | "18Fh" 8->9 | "XXXh" 8->9 with SC | "1FFh" S/M | same as TR 1 | "009h" 8->9 | "XXXh" 8->9 with SC | "XXXh" 8->9 with SC |
| PATTERN B | HDC IF | "00h" | "FFh" | "FFh" | "XXh" | "00h" | | "FFh" | "XXh" | "00h" |
| | MEDIA | "1FFh" S/M | "133h" S/M | "18Fh" S/M | "XXXh" 8->9 with SC | "1FFh" S/M | | "009h" S/M | "XXXh" 8->9 with SC | "XXXh" 8->9 with SC |
| DATA LENGTH | | 5~30B | 0~5B | 1B | 0~50B | 10~20B | | 1B | XX | XX |

DL spans DATA 1; GL spans PLO 2 through SB 2.

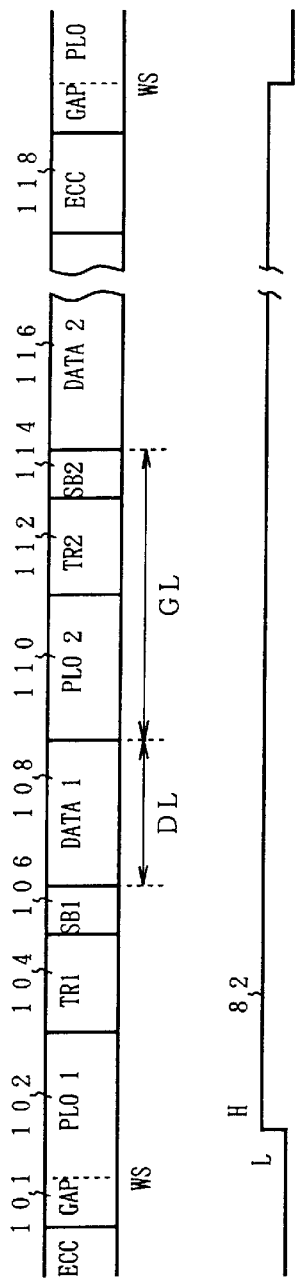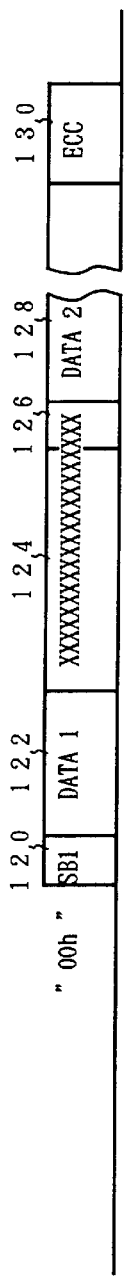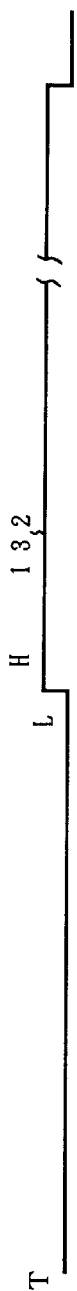
FIG. 5A MEDIUM DATA FORMAT
FIG. 5B READ GATE SIGNAL
FIG. 5C READ DATA AT THE TIME OF NORMAL
FIG. 5D READ DATA WHEN SB1 IS LOST
FIG. 5E READ GATE SIGNAL AT THE TIME OF RETRY
FIG. 5F READ DATA AT THE TIME OF RETRY FIG. 6A
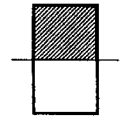
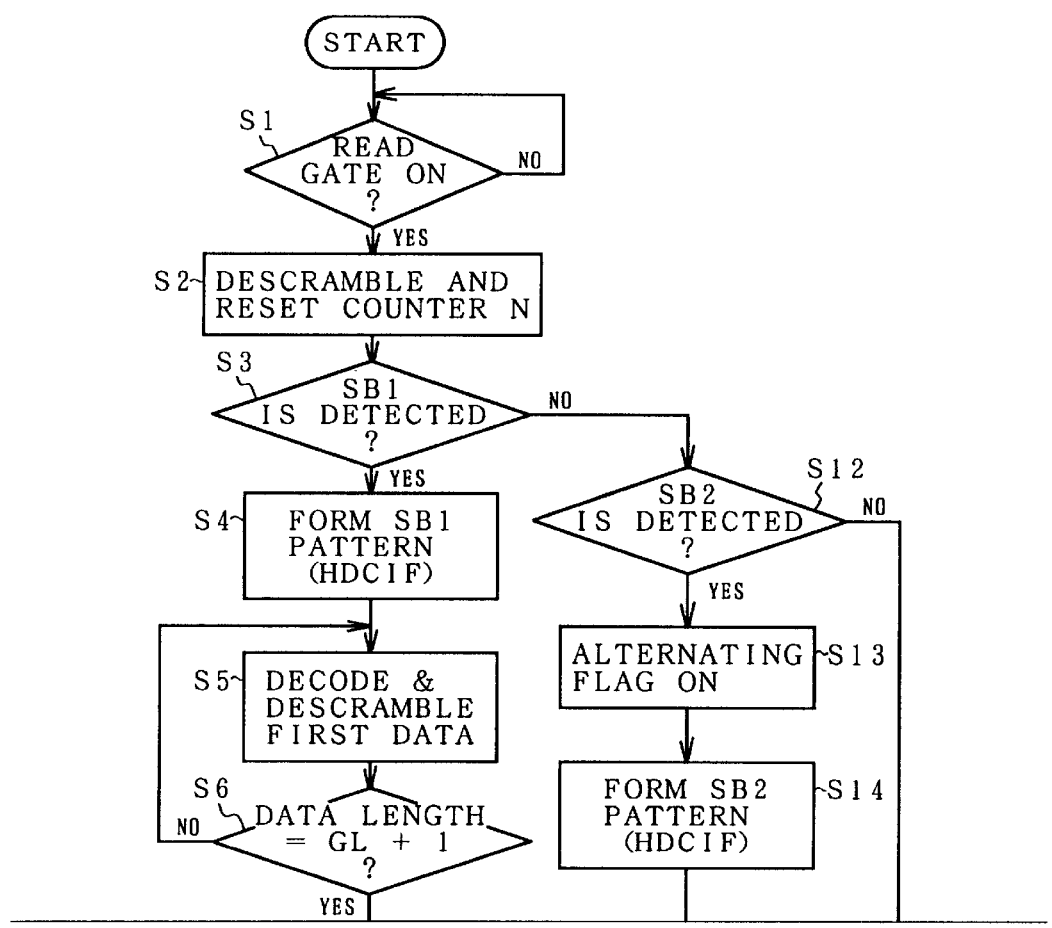

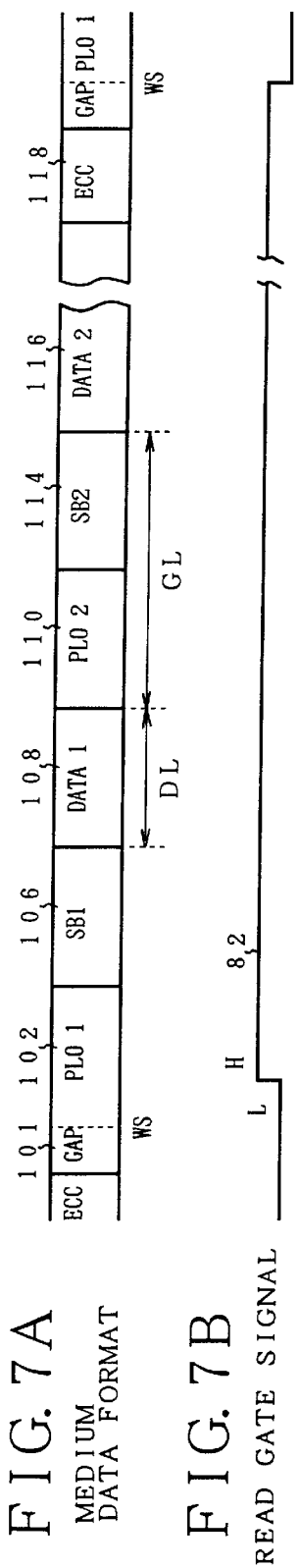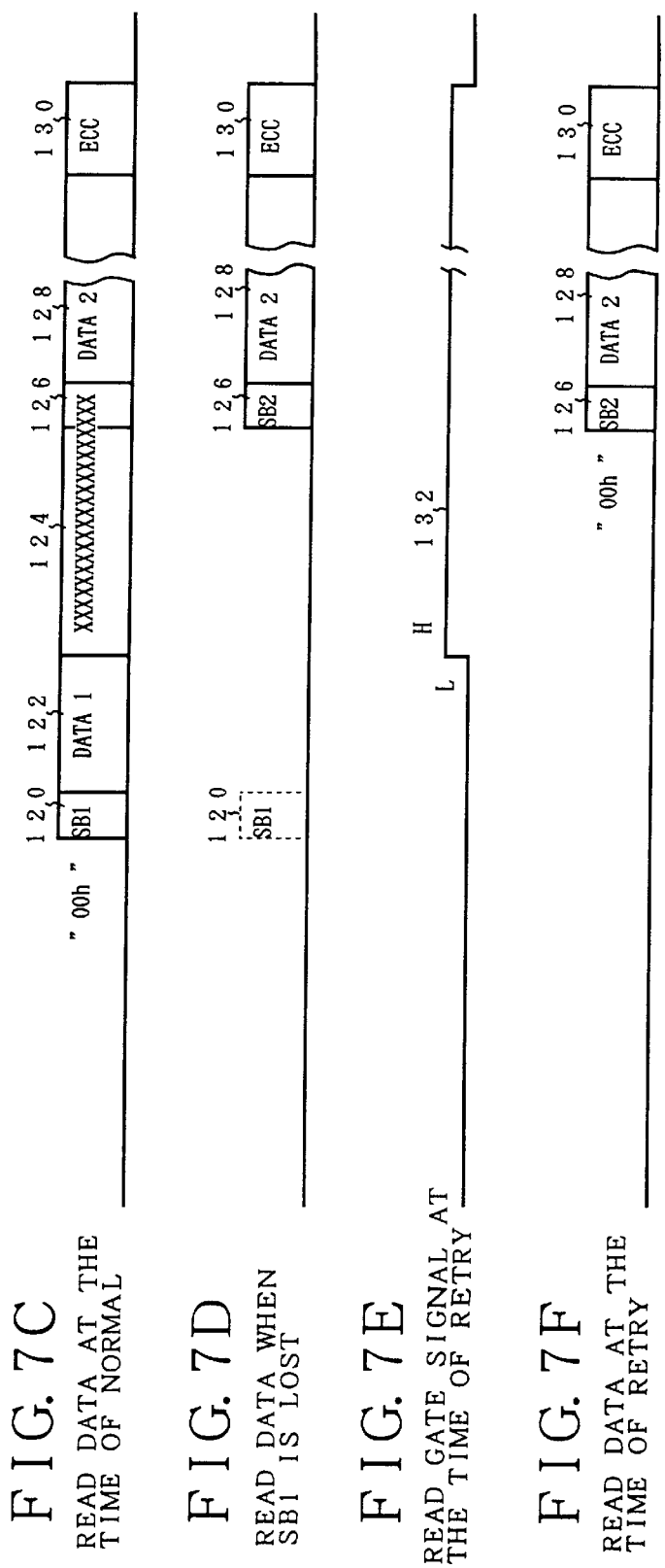

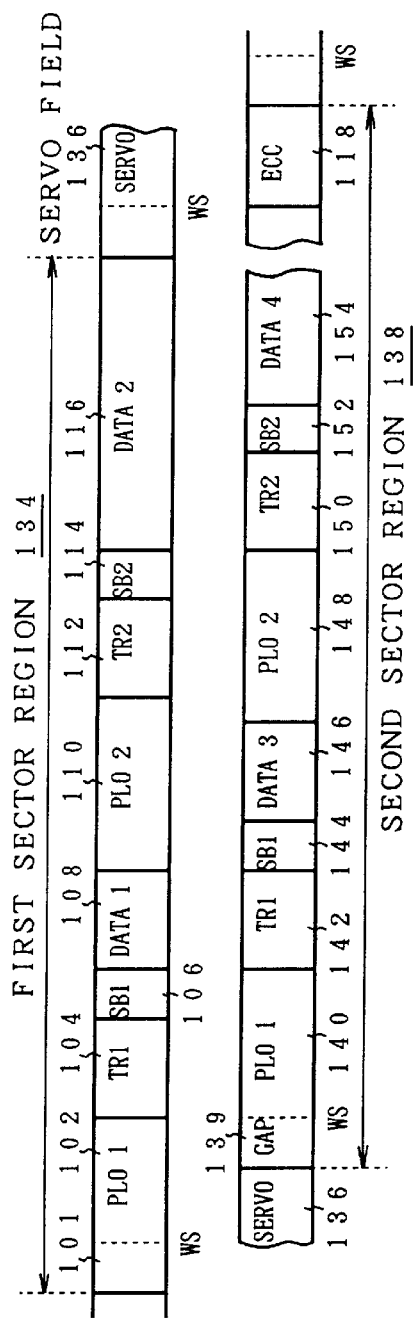
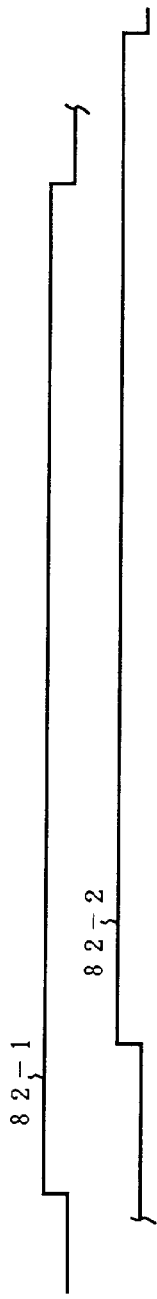
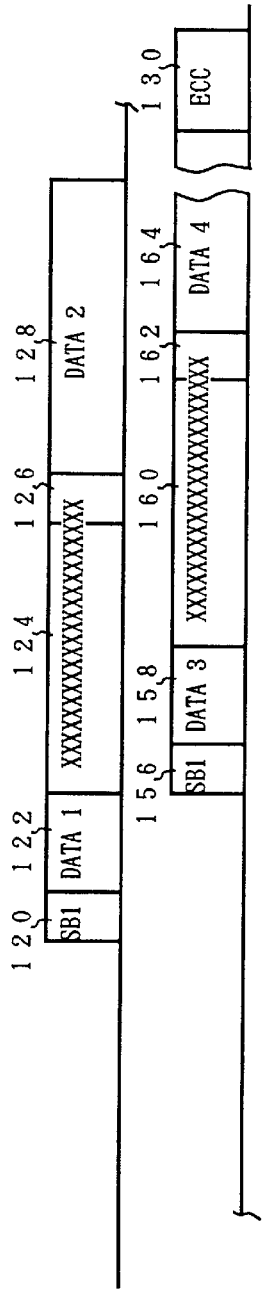
FIG. 9A MEDIUM DATA SPLIT·FORMAT
FIG. 9B READ GATE SIGNAL
FIG. 9C READ DATA AT THE TIME OF NORMAL

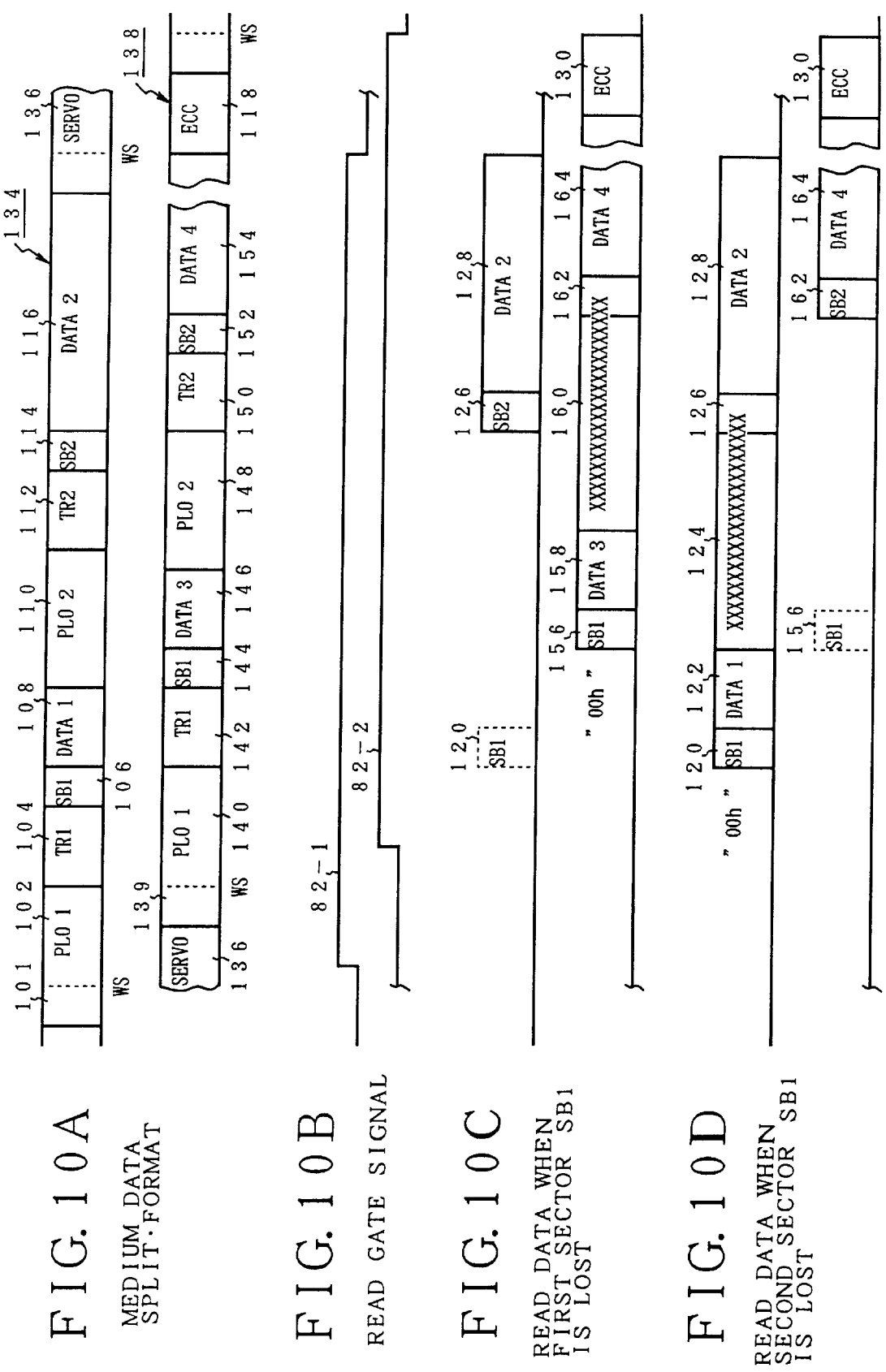

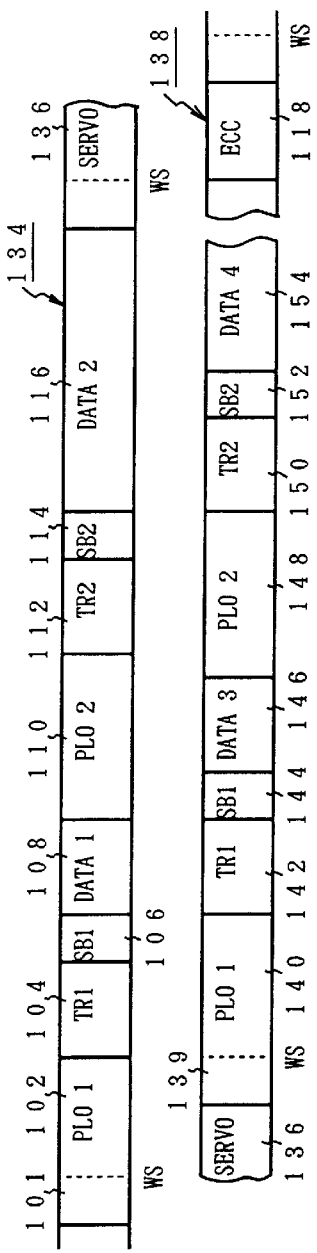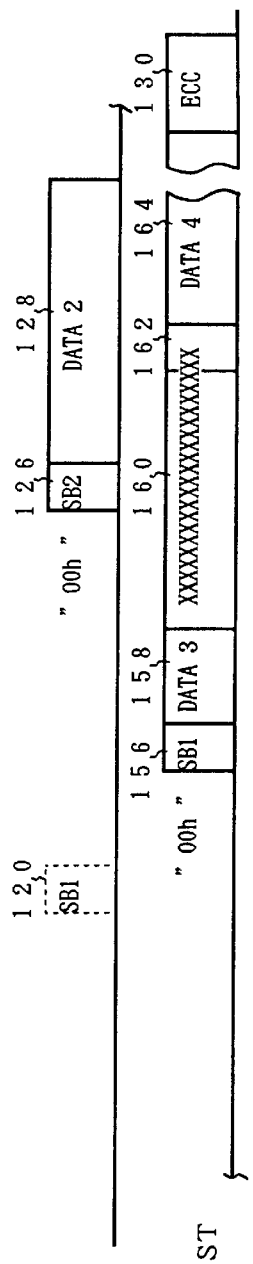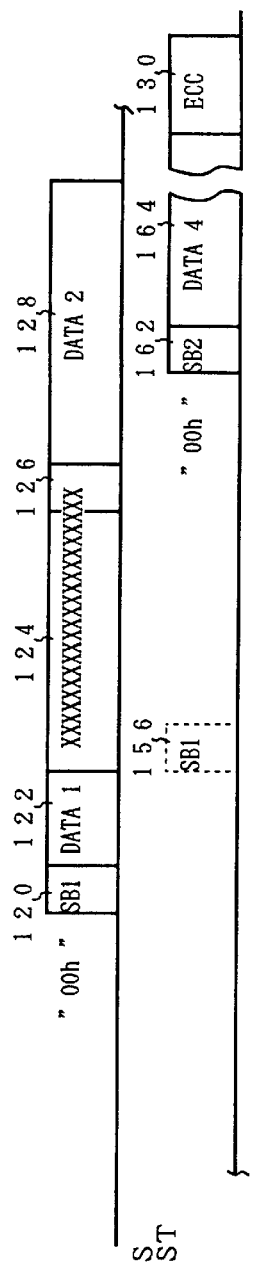
FIG. 11A  MEDIUM DATA SPLIT·FORMAT
FIG. 11B  READ GATE SIGNAL AT THE TIME OF RETRY DUE TO THE LOSS OF PREVIOUS SECTORS SB1 AND SB2
FIG. 11C  RETRY READ DATA WHEN FIRST SECTORS SB1 AND SB2 ARE LOST
FIG. 11D  RETRY READ DATA WHEN SECOND SECTORS SB1 AND SB2 ARE LOST

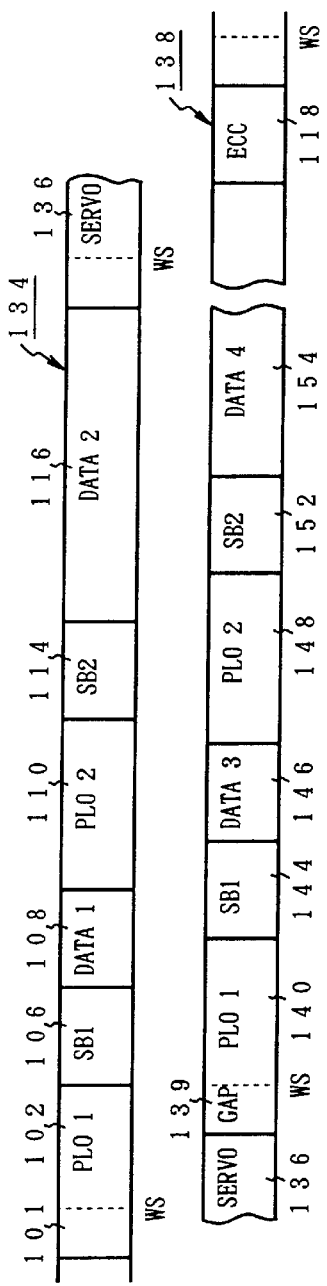
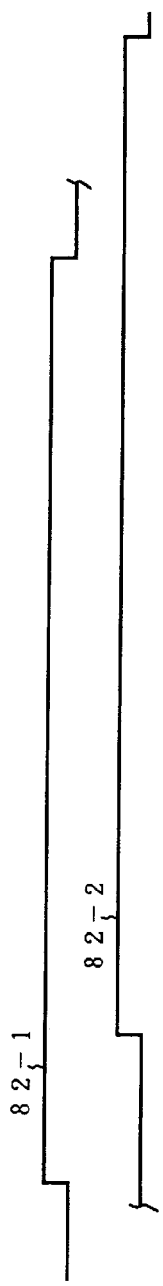
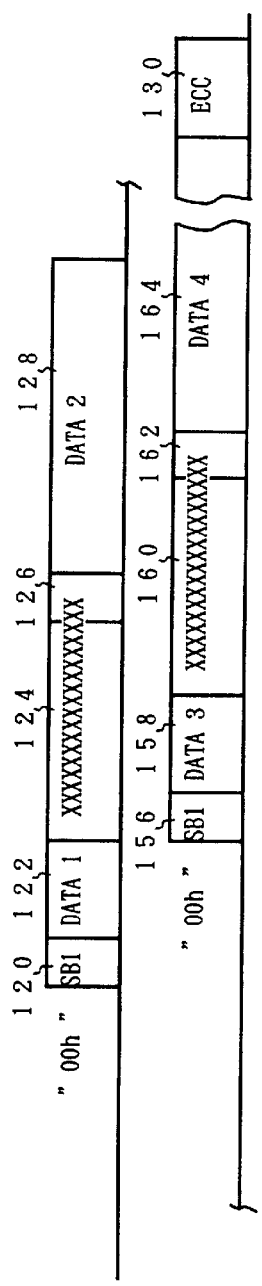
FIG. 12A  MEDIUM DATA SPLIT·FORMAT
FIG. 12B  READ GATE SIGNAL
FIG. 12C  READ DATA AT THE TIME OF NORMAL

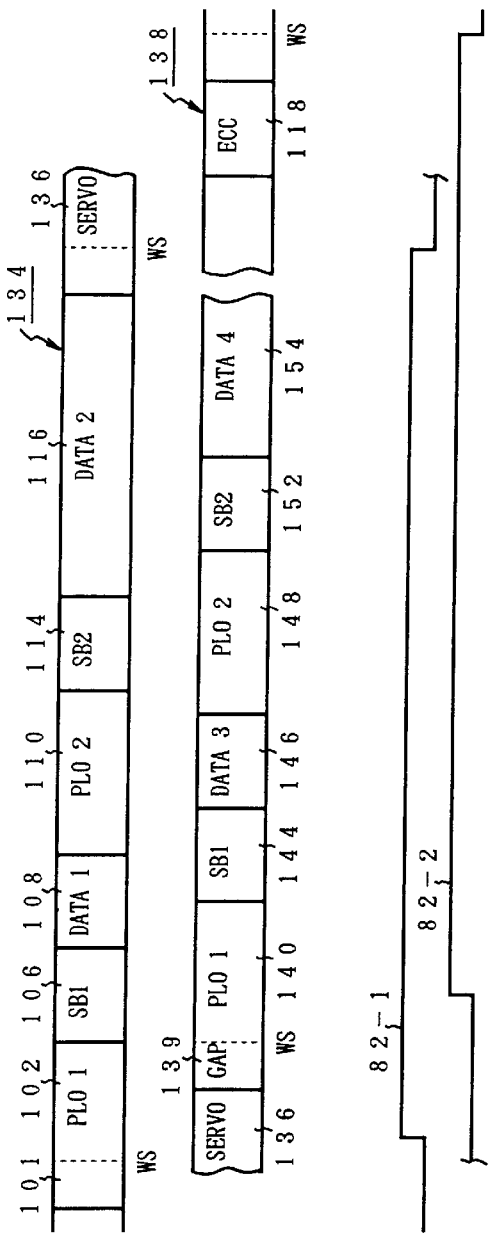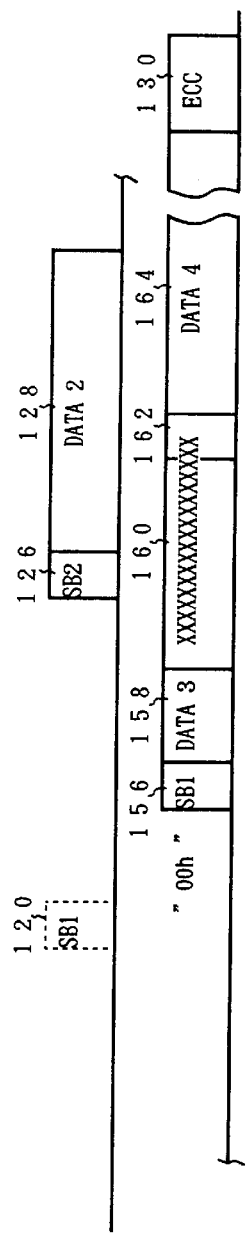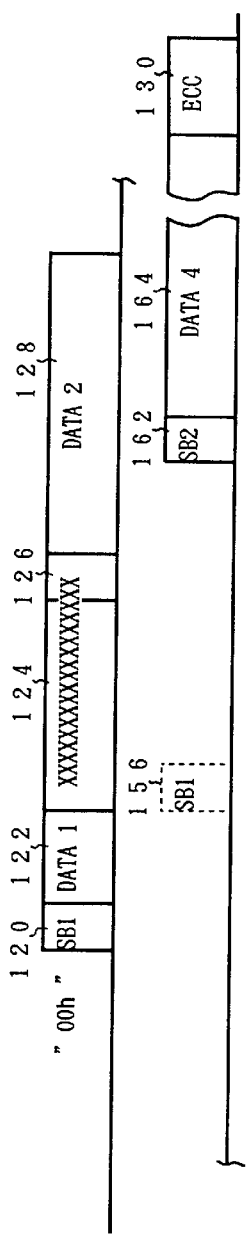
FIG. 13A MEDIUM DATA SPLIT·FORMAT
FIG. 13B READ GATE SIGNAL
FIG. 13C READ DATA WHEN FIRST SECTOR SB1 IS LOST
FIG. 13D READ DATA WHEN SECOND SECTOR SB1 IS LOST

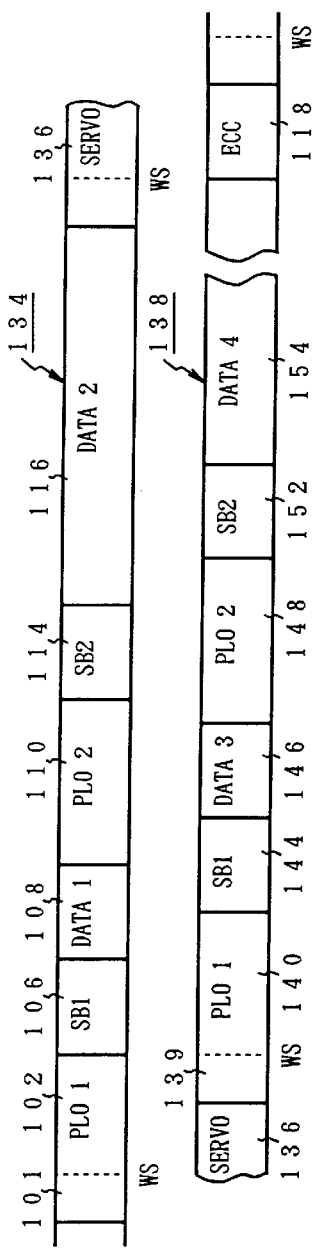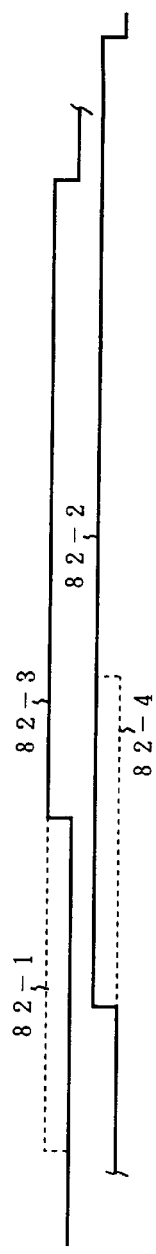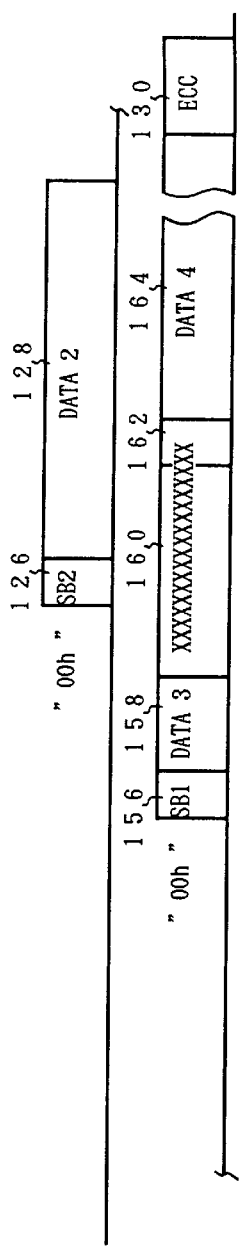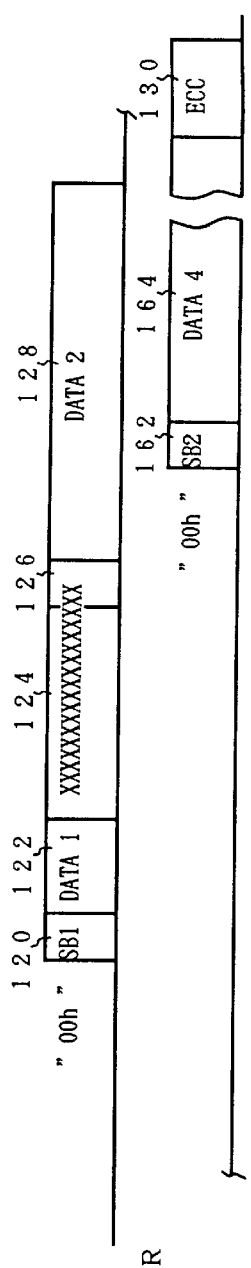
FIG. 14A MEDIUM DATA SPLIT·FORMAT
FIG. 14B READ GATE SIGNAL AT THE TIME OF RETRY DUE TO THE LOSS OF PREVIOUS SECTOR SB1
FIG. 14C RETRY READ DATA WHEN FIRST SECTOR SB1 IS LOST
FIG. 14D RETRY READ DATA WHEN SECOND SECTOR SB1 IS LOST

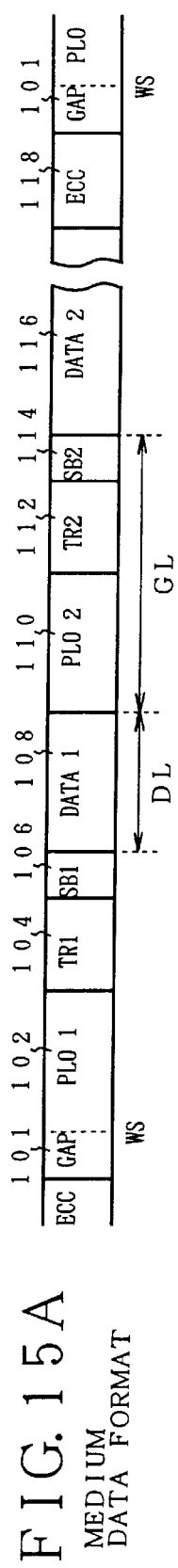
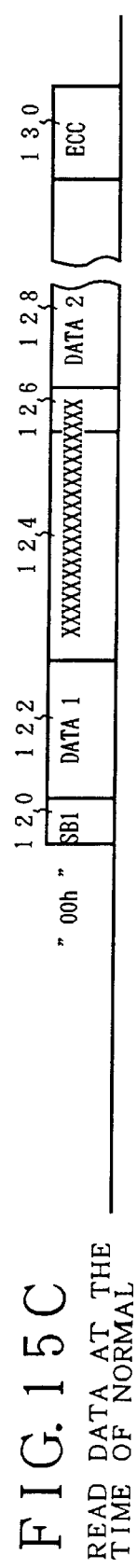
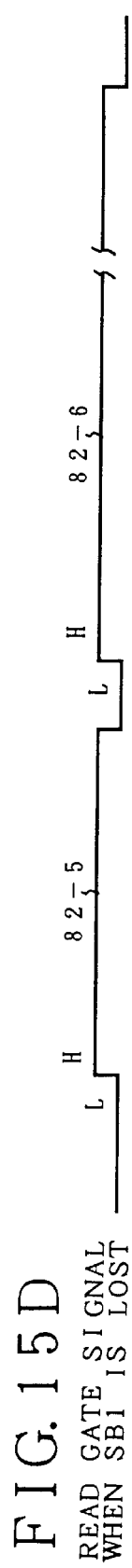
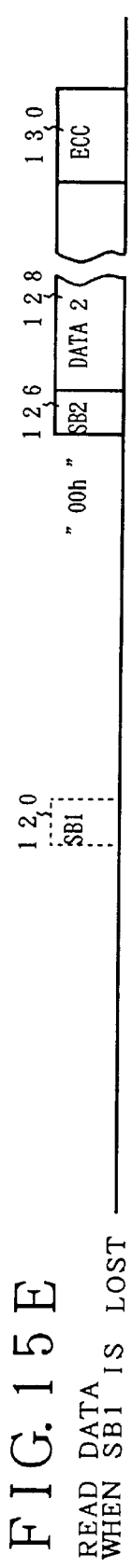
FIG. 15A MEDIUM DATA FORMAT
FIG. 15B READ GATE SIGNAL
FIG. 15C READ DATA AT THE TIME OF NORMAL
FIG. 15D READ GATE SIGNAL WHEN SB1 IS LOST
FIG. 15E READ DATA WHEN SB1 IS LOST

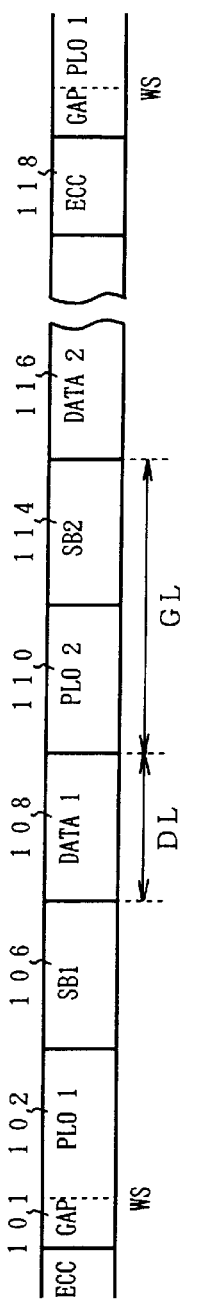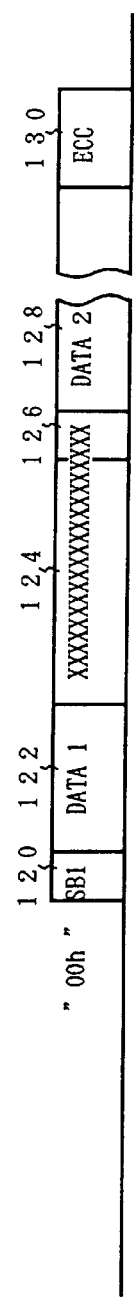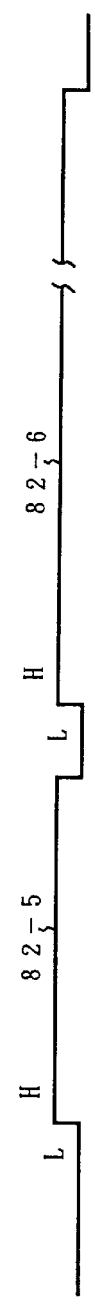
FIG. 16A MEDIUM DATA FORMAT
FIG. 16B READ GATE SIGNAL
FIG. 16C READ DATA AT THE TIME OF NORMAL
FIG. 16D READ GATE SIGNAL WHEN SB1 IS LOST
FIG. 16E READ DATA WHEN SB1 IS LOST

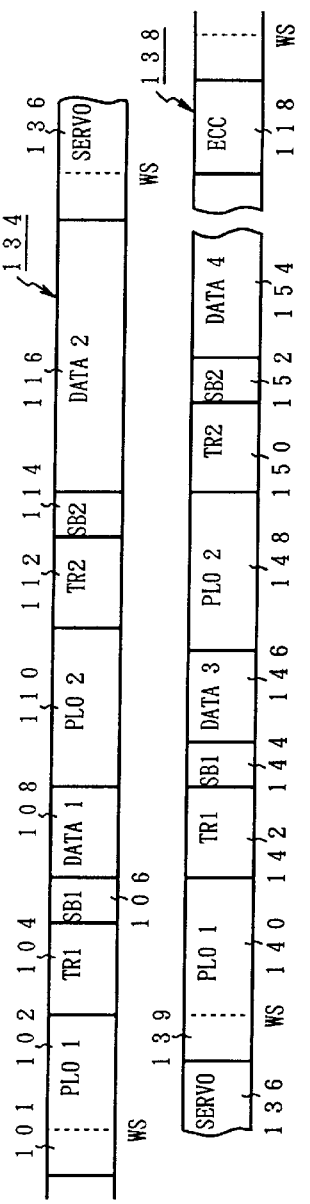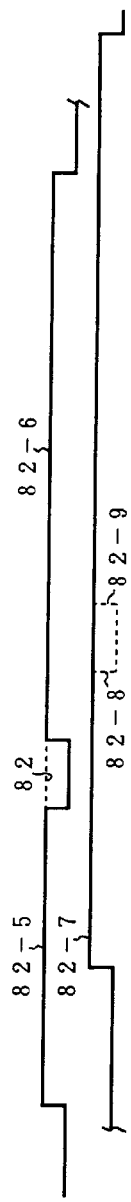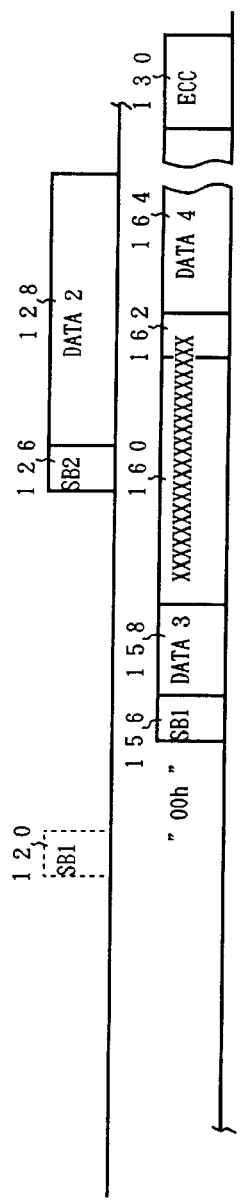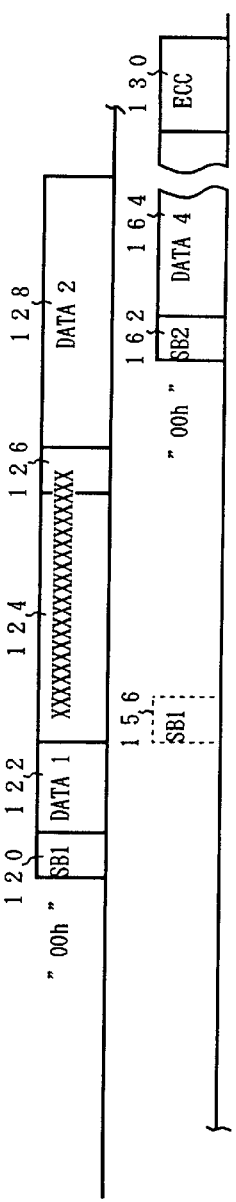
FIG. 17A MEDIUM DATA SPLIT·FORMAT
FIG. 17B READ GATE SIGNAL
FIG. 17C READ DATA WHEN FIRST SECTOR SB1 IS LOST
FIG. 17D READ DATA WHEN SECOND SECTOR SB1 IS LOST

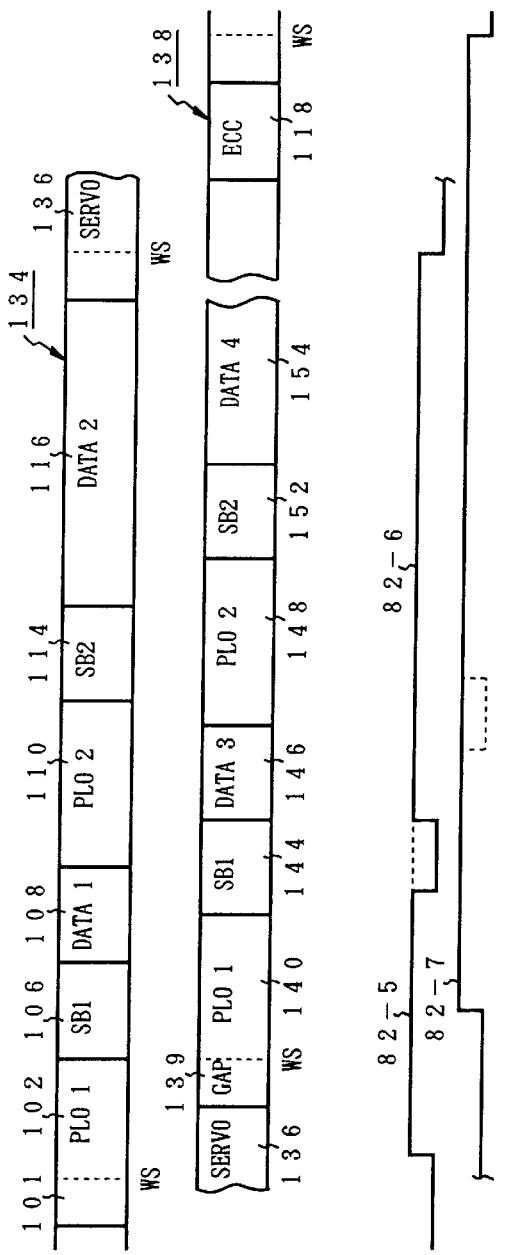
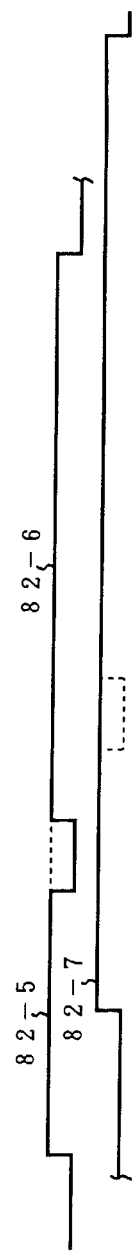
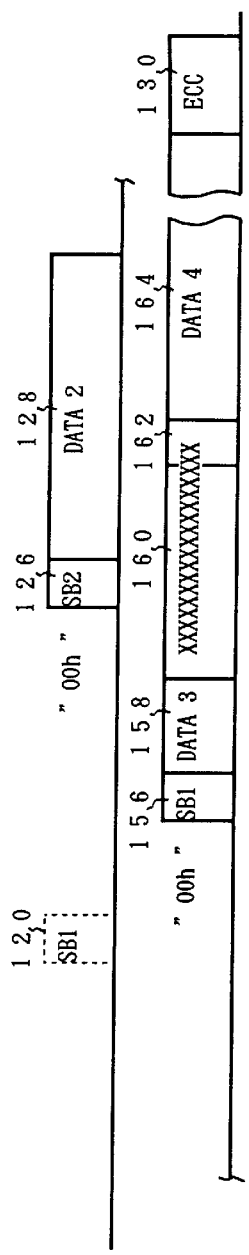
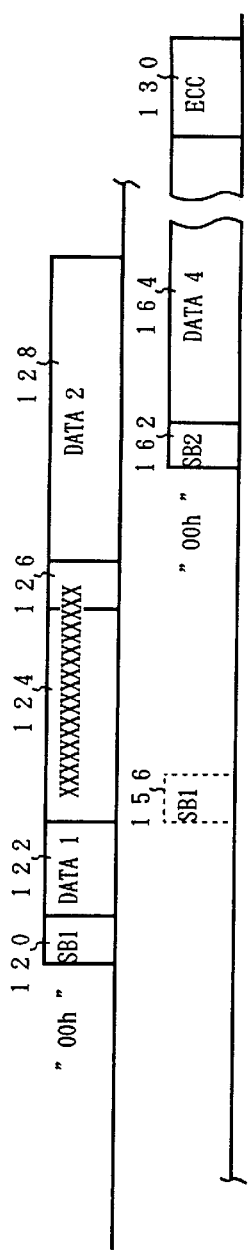
FIG. 18A MEDIUM DATA SPLIT·FORMAT
FIG. 18B READ GATE SIGNAL
FIG. 18C READ DATA WHEN FIRST SECTOR SB1 IS LOST
FIG. 18D READ DATA WHEN SECOND SECTOR SB1 IS LOST

FIG. 20A READ SIGNAL E1

FIG. 20B DECODING ERROR DETECTION SIGNAL E2

FIG. 20C COMPARISON OUTPUT SIGNAL E3

FIG. 20D TA DETECTION SIGNAL E4

WRITE GATE SIGNAL

HDC DATA

TIMING SIGNAL

SCRAMBLING SIGNAL

MEDIUM DATA FORMAT

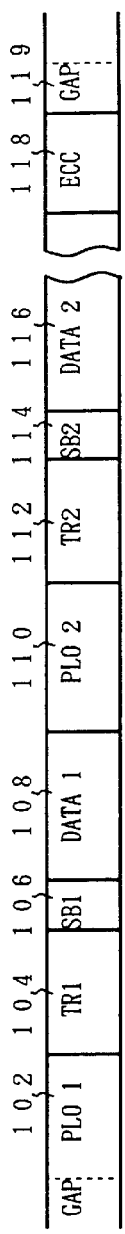
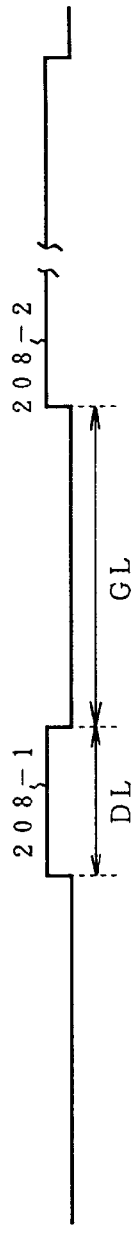
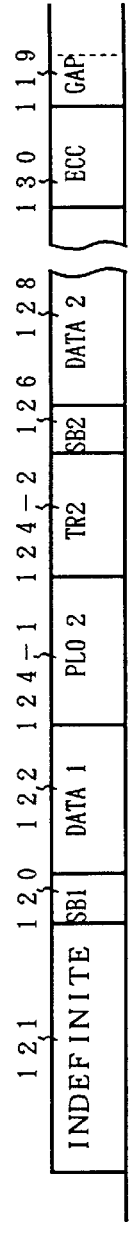

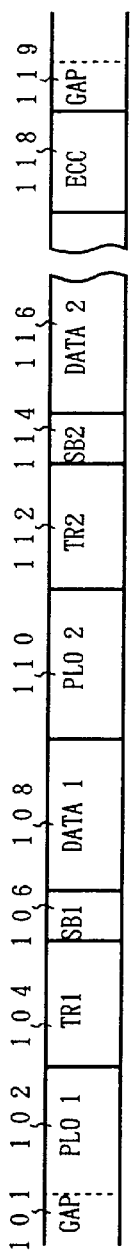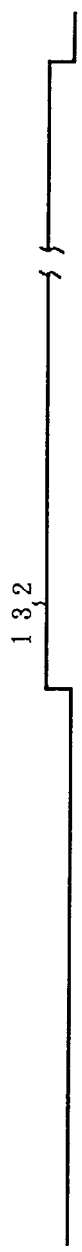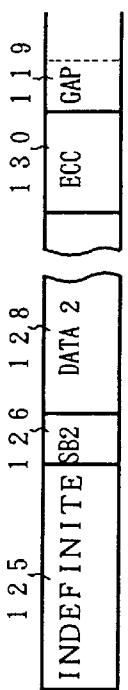
FIG. 25A MEDIUM DATA FORMAT
FIG. 25B READ GATE SIGNAL
FIG. 25C SB DETECTION SIGNAL
FIG. 25D DESCRAMBLING SIGNAL
FIG. 25E READ DATA

MAGNETIC DISK APPARATUS AND MAGNETIC DISK MEDIUM

TITLE OF THE INVENTION

Magnetic disk apparatus and magnetic disk medium

BACKGROUND OF THE INVENTION

The present invention relates to a magnetic disk apparatus for reading medium information by an MR head and, more particularly, to a magnetic disk apparatus which can properly recover a sync byte pattern at the head of a sector when such a sync byte pattern is lost by a thermal asperity ie. therefor collision heat generation (friction heat) occurring when the MR head comes into contact with a medium.

In recent years, in association with an increase in capacity of a magnetic disk apparatus as an external storage device of a computer, a magnetic head of a high performance is requested. As a magnetic head satisfying the request, attention is paid to a magnetic disk apparatus having what is called an MR head using a magneto-resistive element which can obtain a high reproduction output without depending on a peripheral velocity of a recording medium. In the magnetic disk apparatus using such an MR head as a read head, however, when the MR head collides with a physical convex or concave portion due to an extremely slight dent, a deformation, or the like on the surface of the medium which is rotating, a temperature of the MR head rises instantaneously by a friction heat. When the temperature of the MR head rapidly rises by the contact with the medium as mentioned above, a base line of a read signal is shifted, and a read error which cannot be recovered occurs. This state is seemingly the same as when a medium defect exists. The phenomenon in which the read error occurs by the collision heat generation of the MR head with the medium is usually called a thermal asperity. That is, when a state in which a sync byte pattern cannot be read as a result of thermal asperity of the MR head in a sync byte region in a read sector on a medium track, sector data cannot be demodulated at all. In this case, although the reading operation is executed again, since the defect caused by the thermal asperity of the MR head is a kind of physical defects, the same reading impossible state repetitively occurs in the same sync byte region and an unrecoverable read error is caused. For a high density recording of the medium, it is necessary to reduce a floating height of the MR head and this results in a factor of an increase in number of times of occurrence of the defect due to the thermal asperity of the MR head. As a rotational speed of the medium increases, when the thermal asperity of the MR head occurs, the shift of the base line of the read signal further increases. Further, every possible tests have been performed to the magnetic disk apparatus at a factory stage. The defect caused by the thermal asperity of the MR head is, however, a problem occurring during the use by the user. Further, since there is a tendency such that the defect grows while the user is using the apparatus, there is a fear that the performance of the magnetic disk apparatus remarkably deteriorates.

SUMMARY OF THE INVENTION

According to the invention, there are provided a magnetic disk apparatus and a magnetic disk medium which can realize a strong recovery for a defect caused by a thermal asperity of an MR head in a sync byte region.

It is an object of the invention to provide a magnetic disk apparatus for writing and reading information to/from tracks of a medium on a sector unit basis by using a combination head having a write head, for example, an inductive head and a read head, for instance, an MR head.

(Basic sector format)

A writing unit (write channel) of a magnetic disk apparatus of the invention splits a sync byte pattern into two patterns of a first sync byte pattern and a second sync byte pattern at the time of writing to a sector region, splits write data into two data of first data and second data, writes the first data subsequently to the first sync byte pattern, writes the second data subsequently to the second sync byte pattern, and finally writes an error detection correction code. When the first sync byte pattern is detected from read data, a reading unit (read channel) demodulates the subsequent first data, second data, and error detection correction code. When the first sync byte pattern is not detected but the second sync byte pattern is detected, the reading unit demodulates the subsequent second data and error detection correction code and reconstructs the lost first data by the error detection correction code. A data length of the first data arranged subsequently to the first sync byte pattern is equal to or longer than a length of defect caused by the thermal asperity of the MR head with the medium and is equal to or shorter than a length of data which can be corrected by the error detection correction code. Even if the loss of data occurs due to the thermal asperity of the MR head, therefore, either one of the split first and second sync byte patterns is lost and sector data can be read out by a normal detection of either one of them. That is, when the first sync byte pattern is lost, the second data and the error detection correction code are normally demodulated by detecting the subsequent second sync byte pattern and the lost first data can be recovered by the error detection correction code without a problem. When the second sync byte pattern is lost, the split data can be read out by detecting the first sync byte pattern without a problem. The first and second sync byte patterns are made different, thereby enabling each pattern to be certainly detected. The writing unit also writes a training pattern for automatically adjusting a circuit constant (tap coefficient) of an automatic equalizer (transversal filter) provided for the reading unit to an optimum value to a position before each of the first and second sync byte patterns. The writing unit also writes a pilot pattern for synchronizing a clock generating circuit provided for the reading unit with the read data to a position before each of the first and second sync byte patterns. Further, the writing unit has a scrambling circuit for scrambling each of the first and second data and, further, the error detection correction code to be written to the medium by using a predetermined pseudo random code (for example, M series code). In correspondence to the scrambling circuit, the reading unit has a descrambling circuit for descrambling the first and second data and the error detection correction code read out from the medium by using the pseudo random code. A gap pattern at a sector boundary can be also scrambled and descrambled.

When the first sync byte pattern is detected, after the first data is demodulated, the reading unit skips the demodulation of the second sync byte pattern and demodulates the second data and the error detection correction code. Specifically speaking, the reading unit presets the data length of the first data and the gap length from the first data to the second data, demodulates the first data for an interval of the data length after the end of the detection of the first sync byte pattern, and after that, skips the pattern detection for an interval of the gap length, and starts the demodulation of the second data. When the first sync byte pattern can be detected separately from the data demodulation, whether data has correctly been written at the position of the second sync byte or not is discriminated from the data length and the gap length. If the data is not correctly written, it is determined that the second sync byte pattern is not correct, and a read sector is regarded as a defective sector and is dealt as a target of an alternating process after completion of the reading process. When both of the first and second sync byte patterns cannot be detected, the reading unit executes the reading process again (retry). In the rereading process, a read gate is turned on at a position of a pilot pattern subsequent to the first data and the pattern detection is started. When the second sync byte pattern is detected, the subsequent second data and error detection correction code are demodulated and the first data is reconstructed by the error detection correction code.

The invention is also applied to a magnetic disk apparatus having what is called an "on the fly" function for demodulating read data from an MR head while transferring the read data as a continuous data stream by a reading unit to an upper apparatus. Although the first and second sync byte patterns are the same pattern in "on the fly", they can be also different patterns. In case of "on the fly", the reading unit turns on the read gate at a position of a first pilot pattern at the head of a sector, thereby starting the detection of the sync byte pattern. When the first sync byte pattern cannot be detected, after turning on the read gate, the read gate is turned off at a position of a predetermined data length. Subsequently, the read gate is again turned on at a position of a second pilot pattern, thereby starting the detection of the sync byte pattern. When the second sync byte pattern is detected, the reading unit demodulates the subsequent second data and error detection correction code and reconstructs the data by the error detection correction code. Further, when the first sync byte cannot be detected or when the second sync byte cannot be detected at a predetermined position after the first sync byte is detected (data was normally read), the magnetic disk apparatus of the invention determines the read sector to be a defective sector and executes the alternating process after the end of the reading process. Thus, even when the defective sector due to the thermal asperity of the MR head occurs during the use by the user, the defect is eliminated by the alternating process and a growth of the defect can be substantially suppressed.

(Data split)

In the disk apparatus of the invention, when a servo region has preliminarily been recorded in the middle of a sector region of the medium to which data is written, the writing unit splits the servo region into two regions of a first sector region before the servo region and a second sector region after the servo region. That is, with respect to each of the split first and second sector regions, the write data of one sector is split into two data of first split data and second split data. Further, the first split data is split into two data of first data and second data. Simultaneously, the second split data is split into two data of third data and fourth data. With respect to the first sector region, the first data is written subsequently to the first sync byte pattern and the second data is written subsequently to the second sync byte pattern. With respect to the second sector region, the third data is written subsequently to the first sync byte pattern, the fourth data is written subsequently to the second sync byte pattern, and further, the error detection correction code of the write data is written after the fourth data. The data length of each of the first and third data arranged subsequently to the first sync byte pattern is set to be equal to or longer than a length of defect caused by the thermal asperity of the MR head and is set to be equal to or shorter than a length of data which can be corrected by the error detection correction code. The first and second sync byte patterns are set to different patterns. Further, the writing unit writes a training pattern for automatically adjusting a circuit constant of an automatic equalizer (tap coefficient of a transversal filter) provided for the reading unit to an optimum value to a position before each of the first and second sync byte patterns. Further, the writing unit also writes a pilot pattern for synchronizing a clock generating circuit with a read signal to a position before each of the first and second sync byte patterns.

The writing unit has a scrambling circuit for scrambling each of the first to fourth data and the error detection correction code which are written to the medium by using a predetermined pseudo random code. Simultaneously, the reading unit has a descrambling circuit for descrambling each of the first to fourth data and the error detection correction code read out from the medium by using the pseudo random code. In case of the data split, when the first sync byte pattern is detected with respect to the first sector region, after the first data was demodulated, the reading unit skips the demodulation of the second sync byte pattern and demodulates the second data. Subsequently, when the first sync byte pattern is detected with respect to the second sector region, after demodulating the third data, the demodulation of the second sync byte pattern is skipped, and the fourth data and the error detection correction code are demodulated. Specifically speaking, the reading unit presets a data length of the first or third data, a gap length from the first data to the second data, and a gap length from the third data to the fourth data. With respect to the first sector region, the first data is demodulated for an interval of the data length from the end of the detection of the first sync byte pattern, skips the pattern detection for an interval of the gap length, and after that, starts the demodulation of the second data. Subsequently, with respect to the second sector region, the third data is demodulated for an interval of the data length from the end of the detection of the first sync byte pattern, the pattern detection is skipped for an interval of the gap length, and after that, the demodulation of the fourth data is started. With respect to the data split, when the first sync byte pattern in the first sector region is not detected but the second sync byte pattern is detected, the reading unit demodulates the subsequent second to fourth data and the error detection correction code and reconstructs the first data by the error detection correction code. As for the data split, in the case where the first and second data in the first sector region are normally demodulated and the first sync byte pattern is not detected upon reading of the second sector region and the third data is lost and the second sync byte pattern is detected, the reading unit demodulates the subsequent fourth data and the error detection correction code and reconstructs the third data by the error detection correction code. Further, with regard to the data split, when both of the first and second sync byte patterns in the first sector region or both of the first and second sync byte patterns in the second sector region cannot be detected, the reading unit performs the rereading process. In the case where the first sector region cannot be demodulated and the process is shifted to the rereading process, rereading process, the reading unit turns on the read gate by the detection of the first pilot pattern subsequent to the first data and starts the pattern detection. When the second sync byte pattern is detected, the reading unit demodulates the subsequent second to fourth data and the error detection correction code and reconstructs the first data by the error detection correction code. In the case where the second sector region cannot be demodulated and the process is shifted to the rereading process, after the first and second data in the first sector region are demodulated, the reading unit turns on the read gate by the detection of the pilot pattern subsequent to the third data and starts the pattern detection. When the second sync byte pattern is detected, the reading unit demodulates the subsequent fourth data and the error detection correction code and reconstructs the third data by the error detection correction code.

As an apparatus corresponding to "on the fly" for the data split, the reading unit turns on the read gate at the position of the first pilot pattern in the first sector region and starts the detection of the sync byte pattern. When the first sync byte pattern cannot be detected, the reading unit turns off the read gate at the position of a predetermined data length after the turn-on of the read gate, again turns on the read gate at the position of the second pilot pattern, and starts the detection of the sync byte pattern. When the second sync byte pattern is detected, consequently, the reading unit demodulates the subsequent second data and, further, reconstructs the first data by the error correction while demodulating the third and fourth data in the second sector region and the error detection correction code. After the first and second data in the first sector region are normally demodulated, the reading unit turns on the read gate by the detection of the first pilot pattern in the second sector region and starts the detection of the sync byte pattern. When the first sync byte pattern cannot be detected, the reading unit turns off the read gate at the position of a predetermined data length after the turn-on of the read gate, again turns on the read gate by the detection of the second pilot pattern, and starts the detection of the sync byte pattern. When the second sync byte pattern is detected, the reading unit reconstructs the third data by the error correction while demodulating the subsequent fourth data and the error detection correction code.

Further, according to the magnetic disk apparatus of the invention, when the first sync byte pattern in the first or second sector region obtained by the data split cannot be detected or when the second sync byte pattern in the first or second sector region cannot be correctly demodulated at a predetermined position, after the end of the reading process, a read split sector is determined as a defective sector and the alternating process is executed.

(Magnetic disk medium)

Further, according to the invention, there is provided a magnetic disk medium in which information is written and read to/from tracks on a sector unit basis by using a combination head having a write head, for example, an inductive head and a read head, for instance, an MR head.

In the sector region on the medium track, a sync byte pattern is split into two patterns of a first sync byte pattern and a second sync byte pattern and write data is split into two data of first data and second data. The first data is written subsequently to the first sync byte pattern, the second data is written subsequently to the second sync byte pattern, and further, an error detection correction code of the write data is written subsequently to the second data. In the case where the data split is performed, the sector region on the medium track is split into two regions of a first sector region before the servo region and a second sector region after the servo region. The write data of one sector is split into two data of first split data and second split data. Further, the first split data is split into two data of first data and second data and the second split data is split into two of third data and fourth data. In the first sector region, the first data is written subsequently to the first sync byte pattern and the second data is written subsequently to the second sync byte pattern. In the second sector region, the third data is written subsequently to the first sync byte pattern, the fourth data is written subsequently to the second sync byte pattern, and the error detection correction code is finally written. With respect to the split of the sync byte of the magnetic disk medium as well, the details are similar to those in the case of the apparatus.

The above and other objects, features, and advantages of the present invention will become more apparent from the following detailed description with reference to the drawings.

BRIEF DESCRIPTION OF THE DRAWINGS

FIGS. 2A and 2B are block diagrams of a write channel and a read channel in FIG. 1;

FIGS. 3A to 3C are time charts for an HDC data format and a medium data format in a writing process of the invention;

FIG. 4 is an explanatory diagram of a use pattern of the HDC data format and medium data format in FIGS. 3A to 3C;

FIGS. 5A to 5F are the medium data format in FIGS. 3A to 3C and time charts at the times of normal, loss of SB1, and retry in a reading process;

FIGS. 6A and 6B are flowcharts for the reading process in FIGS. 5A to 5F;

FIGS. 7A to 7F are a medium data format of the invention without a training and time charts at the times of normal, loss of SB1, and retry in the reading process;

FIGS. 9A to 9C are a medium data format of a data split and time charts for the reading process at the time of normal;

FIGS. 10A to 10D are a medium data format of the by data split and time charts for the reading process at the time of loss of SB1;

FIGS. 11A to 11D are a data split medium format and time charts for retrying and reading processes at the time of loss of SB1 and SB2;

FIGS. 12A to 12C are a data split medium format without the training and time charts for the reading process at the time of normal;

FIGS. 13A to 13D are a data split medium format without the training and time charts for the reading process at the time of loss of SB1;

FIGS. 14A to 14D are a data split medium format without the training and time charts for the retrying and reading processes at the time of loss of SB1 and SB2;

FIGS. 15A to 15E are a medium data format of the invention by "on the fly" and time charts at the times of normal and loss of SB1 in the reading process;

FIGS. 16A to 16E are a medium format without the training by "on the fly" and time charts at the times of normal and loss of SB1 in the reading process;

FIGS. 17A to 17D are a data split medium format by "on the fly" and time charts at the time of loss of SB1 in the reading process;

FIGS. 18A to 18D are a data split medium format by "on the fly" and time charts for the retrying and reading processes at the time of loss of SB1;

FIGS. 24A to 24F are time charts for the descrambling operation in FIG. 23 at the time of normal; and FIGS. 25A to 25E are time charts for the descrambling operation in FIGS. 24A to 24F at the time of retry due to the loss of SB1 and SB2.

DETAILED DESCRIPTION OF THE PREFERRED EMBODIMENT

[Apparatus construction and basic format]

Figure 1:
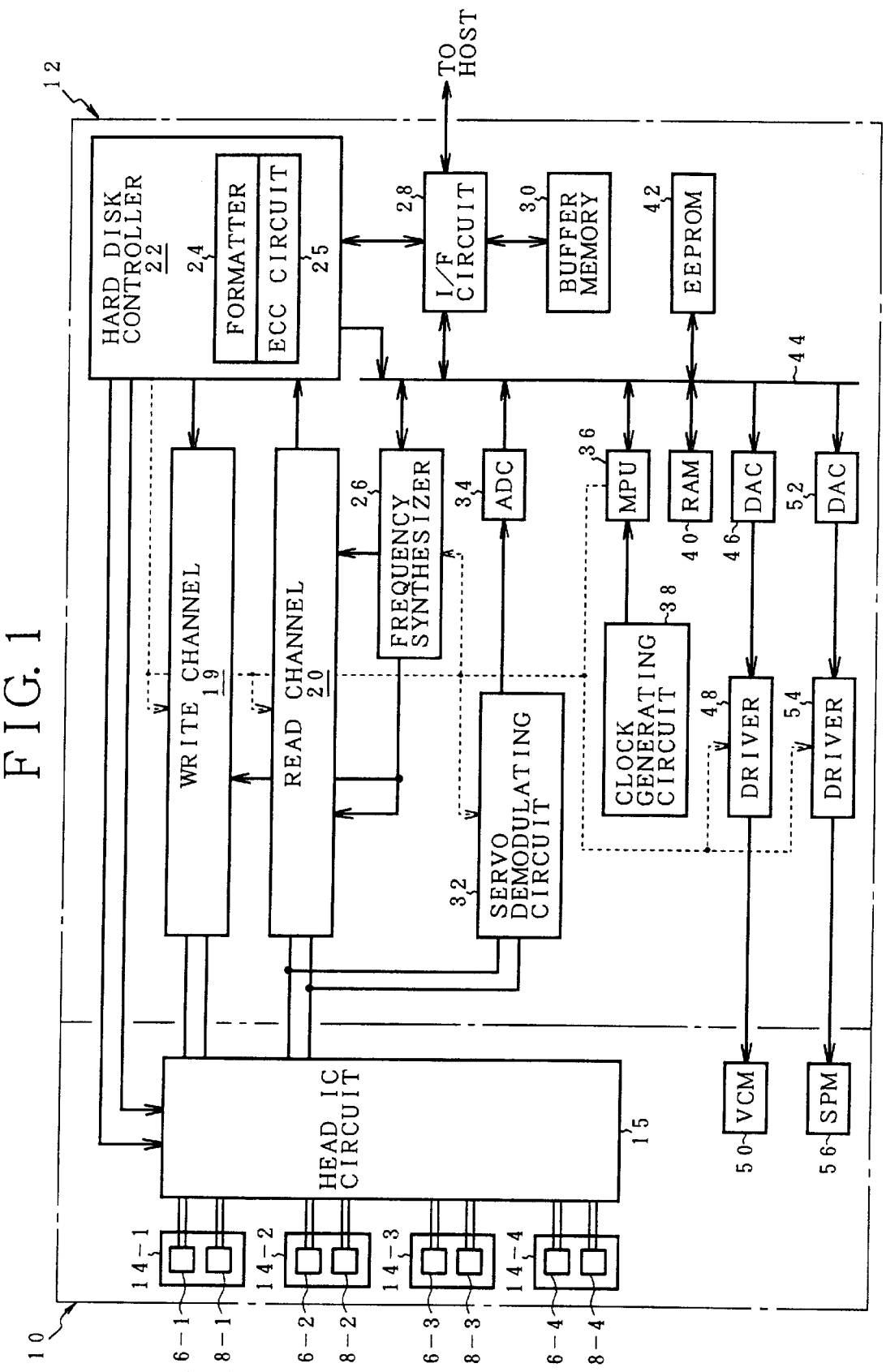
FIG. 1 is a block diagram of an embodiment of a construction of an apparatus of the invention.

FIG. 1 is a block diagram of a magnetic disk apparatus to which a split format of a sync byte pattern of the invention is applied. The magnetic disk apparatus known as a hard disk drive (HDD) is constructed by a disk enclosure 10 and a disk controller 12. A head IC circuit 15 is provided for the disk enclosure 10. In the embodiment, four. combination heads 14-1 to 14-4 are connected to the head IC circuit. The combination heads 14-1 to 14-4 integratedly have inductive heads 16-1 to 16-4 which function as write heads and MR heads 18-1 to 18-4 which function as read heads. A VCM 50 for driving a head actuator and a spindle motor 56 for rotating a disk medium are provided for the disk enclosure 10. For the head IC circuit 15 of the disk enclosure 10, a write channel (WRC) 19 and a read channel (RDC) 20 are provided on the disk controller 12 side. A hard disk controller (HDC) 22 is provided for the write channel 19 and read channel 20 and has a formatter 24 and an ECC circuit 25 therein. The hard disk controller 22 is connected to an interface circuit 28 and performs a supply of write data from a host side and a transfer of read data to the host side by a data transfer to/from the host side of an upper apparatus by the interface circuit 28. A buffer memory 30 which is used for a data transmission to the host side is provided for the interface circuit 28. A servo demodulating circuit 32 is provided for head positioning control in the reading/writing operation for the disk medium. In the embodiment, since a constant density recording system (CDR) is used with respect to the disk medium, cylinders of the disk medium are divided into zones every predetermined number of cylinders and a different frequency has been preset every zone. For this purpose, a frequency synthesizer 26 is provided and a corresponding zone frequency is set from a cylinder address in the reading or writing operation, thereby supplying clocks to the write channel 19 and read channel 20. An MPU 36 controls the whole disk controller 12. A RAM 40 and, further, an EEPROM 42 as a non-volatile memory are connected to the MPU 36 through a bus 44. Since the interface circuit 28 is also connected to the MPU 36 through the bus 44, various commands from the host are received and decoded, a reading/writing operation for the hard disk controller 22 is instructed, and the head positioning control by the driving of the VCM 50 provided for the disk enclosure 10 is performed. A D/A converter 46 and a driver 48 are provided for the bus 44 in order to drive the VCM 50 and the VCM 50 is controlled by an instruction of the MPU 36. The spindle motor 56 is also driven by a D/A converter 52 and a driver 54. A position signal for the head positioning control by the MPU 36 is derived from the servo demodulating circuit 32 and an A/D converter 34.

FIG. 2A is a block diagram of the write channel 19 in FIG. 1. The write channel 19 is made up of: an HDC interface circuit 60 for writing; an 8/9 encoder 62; a parallel/serial converter 64; a precoder 66; a frequency divider 68; and a driver 70. That is, write data formatted by the formatter 24 provided for the hard disk controller 22 in FIG. 1 is supplied to the 8/9 encoder 62 from the HDC interface circuit 60 for writing, NR reset write data is converted, for example, into an 8/9 code, and after that, the converted data is converted into serial data by the parallel/serial converter 64. A preceding of $1/(1+D)^m$ is performed by the precoder 66 in order to detect a partial response maximum likelihood on the read channel 20 side and, after that, a write compensation is executed after the resultant signal is frequency divided by the frequency divider 68. The data is supplied to the write head selected at this time through the head IC circuit 15 in FIG. 1 and is written onto the disk medium by the driver 70.

FIG. 2B is a block diagram of the read channel 20 in FIG. 1. The read channel 20 is made up of: an amplifier 72; an AGC circuit 74; an automatic equalizing type maximum likelihood detecting circuit 76; an 8/9 decoder 78; a serial/parallel converter 79; and an HDC interface circuit 80 for reading. That is, the amplifier 72 amplifies a read signal derived through the head IC circuit 15 in FIG. 1. After the amplified signal is amplified by an automatic gain control by the AGC circuit 74, a partial response maximum likelihood detection, for example, a process of PR4LM or EPR4LM is performed by the automatic equalizing type maximum likelihood detecting circuit 76. In the maximum likelihood detection by the partial response, an automatic equalizer using a transversal filter is generally provided before the maximum likelihood detecting circuit. As methods of setting tap coefficients of the transversal filter as an automatic equalizer, there are a fixing equalizing type in which the tap coefficients have fixedly been preset when shipping from a factory and an automatic equalizing type for automatically adjusting the tap coefficients by using a training signal recorded in a sector format of the disk medium. The 8/9 decoder 78 demodulates the encoding data which was encoded and converted by the 8/9 encoder 62 on the write channel 19 side to the original NRZ data. The demodulated data from the 8/9 decoder 78 is converted into parallel data by the serial/parallel converter 79. The parallel data is transferred to the hard disk controller 22 in FIG. 1 through the HDC interface circuit 80 for reading.

FIGS. 3A to 3C are time charts for an HDC data format, a medium data format, and a write gate signal when the data is written onto the disk medium by the hard disk controller 22 and write channel 19 in FIG. 1. A write gate signal 81 in FIG. 3A is generated by the hard disk controller 22 for a period of time of the sector format on the disk medium. As shown in the HDC data format of FIG. 3B, a signal of a data format formatted by the formatter 24 provided for the hard disk controller 22 in FIG. 1 is supplied to the write channel 19 synchronously with the write gate signal 81. That is, the HDC data format in FIG. 3B denotes a format of data received from the hard disk controller 22 by the HDC interface circuit 60 for writing in FIG. 2A. In the HDC data format, a first pilot pattern 84 shown by PLO1 is provided as a preamble. Subsequent to the first pilot pattern 84, a first training pattern 86 shown by TR1 to perform a training of the automatic equalizing type maximum likelihood detecting circuit 76 of the read channel 20 in FIG. 2B is provided. A first sync byte pattern 88 shown by SB1 is provided and first data 90 shown by DATA1 is sequentially provided.

A second pilot pattern 92 shown by PLO2 serving as the same preamble as the sector head and a second training pattern 94 shown by TR2 are provided. After that, a second sync byte pattern 96 shown by SB2 is provided. Second data 98 shown by DATA2 is provided after the second sync byte pattern 96. An error detection correction code 100 shown by ECC is finally provided. As will be obviously understood from the HDC data format, in the format of the write data of the invention, although only one sync byte pattern was hitherto provided in the sector head portion, the sync byte pattern is divided into two patterns of the first sync byte pattern 868 and second sync byte pattern 96. The write data is also divided into two data of the first data 90 and second data 98. A sync byte split system in which the first data 90 is arranged after the first sync byte pattern 88 and the second data 98 is arranged after the second sync byte pattern 96 is used.

In correspondence with the HDC data format of FIG. 3B as mentioned above the medium data format which is written to the disk medium by the write channel 19 in FIG. 1 through the head IC circuit 15 has a format construction as shown in FIG. 3C, namely: from the head, a gap field 101; a first pilot field 102; a first training field 104; a first sync byte field 106; a first data field 108; a second pilot field 110; a second training field 112; a second sync byte field 114; a second data field 116; and an ECC field 118. The reason why such a split system in which the sync byte pattern is divided into the first sync byte pattern 88 and second sync byte pattern 96 is to prevent a situation such that the byte read data is lost by the thermal asperity of the MR head and the sector reading operation enters a recovery impossible state. That is, in the case where in the first sync byte field 106 in the medium data format of FIG. 3C, a contact with the disk medium occurs by the thermal asperity of the MR head and the read data is lost as data which cannot be reproduced, the second data 98 of the second data field 116 is effectively read out by reading out the second sync byte pattern 96 of the second sync byte field 114 provided subsequently, thereby enabling the lost first data 90 to be recovered on the basis of the error detection correction code 100 of the ECC field 118. When seeing the medium data format of FIG. 3C as an example, a data length, namely, byte length DL of the first data field 108 provided after the first sync byte field 106 has the following relation such that it is set to a value which is equal to or larger than the number of bytes to be lost by the thermal asperity of the MR head and is equal to or less than a data length, namely, the number of bytes which can be corrected by the error detection correction code 100.

$$(ECC \text{ correction length}) \geq (\text{first data length } DL) \geq (\text{lengtht of lost } TA) \quad (1)$$

Specifically speaking, the error detection correction code 100 can correct a number of bytes by using a Reed Solomon code. As for the number of correctable bytes, for example, ten and a few bytes are assured by interleaving.

FIG. 4 shows specific patterns in the HDC data format of FIG. 3B and the medium data format of FIG. 3C and a specific example of the data length. Two kinds of patterns A and B are shown as data patterns here. The HDC data format of FIG. 3B is shown as "HDCIF" and the medium data format of FIG. 3C is shown as "MEDIA (medium)". That is, the data pattern of "HDCIF" showing the HDC data format is data from the hard disk controller 22 to the HDC interface circuit 60 for writing in FIG. 2A and is data before the conversion by the 8/9 encoder 62. On the other hand, the pattern of "MEDIA" as a medium data format in FIG. 4 is pattern in which the first and second pilot patterns PLO1 and PLO2 were converted into predetermined patterns by a state machine and the remaining patterns were converted by the 8/9 encoder 62 in FIG. 2A. Further, it means that the first data DATA1 and second data DATA2 of "MEDIA" as a medium data format and, further, a gap pattern GAP were subjected to a scramble SC. As first sync byte pattern SB1 and second sync byte pattern SB2, different patterns are used, thereby enabling those patterns to be individually detected. The other first and second pilot patterns PLO1 and PLO2 and training patterns TR1 and TR2 are set to the same patterns. Although a pattern B in FIG. 4 is the same as a pattern A with respect to "HDCIF" showing the HD data format, the training patterns TR1 and TR2, first sync byte pattern SB1, and second sync byte pattern SB2 are converted into predetermined patterns by the state machine instead of the 8/9 encoder. Further, as for the data length, each of the first and second sync byte patterns SB1 and SB2 is set to one byte in a manner similar to the conventional sync byte pattern. The first data DATA1 subsequent to the first sync byte pattern SB1 is determined to a length within a range, for example, of 0 to 50 bytes and this number of bytes, namely, the first data length DL satisfies the conditions of the above equation (1). On the other hand, the first pilot pattern PLO1 is set to 5 to 30 bytes, the first and second training patterns TR1 and TR2 are set to 0 to 5 bytes, and the second pilot pattern PLO2 is set to 10 to 20 bytes. Further, a data length GL from the end of the first data DATA1 in which the data length DL is defined to the second data DATA2 is defined. The gap data length GL is used for skipping the second pilot pattern PL2, second training pattern TR2, and second sync byte pattern SB2 after the first sync byte pattern SB1 is normally detected and the first data DATA1 is demodulated by the reading operation and for starting the demodulation of the second data DATA2.

FIGS. 5A to 5F are time charts for the reading process of the medium data format written as shown in FIG. 3C. FIG. 5A shows one sector of the medium data format and each field is the same as that in FIG. 3C. Among them, the data length DL of the first data field 108 and the gap length GL from the first data field 108 to the second data field 116 are defined on the read channel 20 side in FIG. 1 by, for example, a register storage or the like. WS (Write Splice) shows a boundary of a sector rewriting region. When the reading operation using the MR head for the medium data format of FIG. 5A is performed, a read gate signal (RG signal) 82 as shown in FIG. 5B is derived. That is, when starting the reading operation of the pilot pattern PLO1 of the pilot field, 102 subsequent to the gap pattern GAP of the gap field 101 of the sector head, the read gate signal 82 rises from the L level to the H level, thereby validating the reading operation of the read channel 20 and hard disk controller 22 in FIG. 1. FIG. 5C shows read data when the medium data format of FIG. 5A is normally read. In response to the turn-on to the H level of the read gate signal 82, the read data of the pilot pattern PLO1 and training pattern TR1 is obtained. However, they are provided for a clock synchronization of a main PLL (Phase Locked Loop) circuit included in the automatic equalizing type maximum likelihood detector 76 in FIG. 1 and are signals which are transferred as "00h" from the read channel 20 side to the hard disk controller 22. Subsequently, read data 120 of the sync byte pattern SB1 is normally obtained, read data 122 of the subsequent first data DATA1 is recognized, and the 8/9 converted data is demodulated into NRZ data. The first data DATA1 is monitored by the data length DL. After completion of the reading operation of the byte data corresponding to the data length DL, as shown in the skipped read data 124 and 126 of "XXeee", the read data of the second pilot data PLO2, second training pattern TR2, and second sync byte pattern SB2 is ignored and skipped by only the gap data GL which has previously been defined. Read data 128 of the second data DATA2 is demodulated. Read data 130 of ECC is demodulated. It is also possible to 8/9 convert and demodulate the second pilot pattern PLO2, second training pattern TR2, and second sync byte pattern SB2 of the medium data format as they are. The second pilot pattern PLO2 becomes the data which does not exist in the 8/9 conversion. That is, the skipping process of the second pilot data PLO2, second training pattern TR2, and second sync byte pattern SB2 denotes that although each data is demodulated, a search of the second sync byte pattern SB2 is not performed.

FIG. 5D shows a case where the read data 120 of the first sync byte pattern SB1 is lost by the thermal asperity of the MR head. In this case, in a state in which the read gate signal 82 in FIG. 5B is turned on to the H level, as shown by broken lines, the read data 120 of the first sync byte pattern SB1 is not obtained but the read data 126 of the second sync byte pattern SB2 is obtained after that. Therefore, on the basis of the read data 126 of the second sync byte pattern SB2, the demodulation of the read data 128 of the subsequent second data DATA2 and the read data 130 of ECC by the read channel 20 is executed. In the ECC circuit 25 provided for the hard disk controller 22 in FIG. 1, the hard disk controller 22 obtains the second sync byte pattern SB2 in place of the first sync byte pattern SB1, thereby reconstructing the first data DATA1 which could not be read from the second data DATA2 and demodulated data of the ECC due to the loss of the first sync byte pattern SB1. Therefore, even if the first sync byte pattern SB1 is lost by the thermal asperity of the MR head, the second data DATA2 and EICC based on the detection of the subsequent second sync byte pattern SB2 are demodulated, the first data DATA1 which is lost together with the loss of the first sync byte pattern SB1 is reconstructed by the demodulated ECC, and the reading operation can be normally finished. On the other hand, as shown in FIG. 5C, after the read data 120 of the first sync byte pattern SB1 has been normally obtained and the read data 122 of the first data DATA1 could be normally been demodulated, even if the second sync byte pattern SB2 is lost by the thermal asperity of the MR head, since this portion has originally been subjected to the skipping process according to the gap length GL, even when the second sync byte pattern SB2 is lost, the head position of the read data 128 of the second data DATA2 is recognized and the read data can be normally demodulated without any problem. Even when the loss by the thermal asperity of the MR head is caused in the head portion of the read data 128 of the second data DATA2 and the loss of data occurs, so long as such a loss lies within all a range of a correcting ability by the error detection correction code ECC of the read data 130 to be demodulated at last, the portion of the lost second data DATA2 can be reconstructed in the ECC circuit 25. The reading operation can be normally finished. Further, when the read data of both of the first sync byte pattern SB1 and second sync byte pattern SB2 cannot be detected, since the first data DATA1 and second data DATA2 cannot be demodulated at all, the reading process is again executed as retrying processes as shown in FIGS. 5E and 5F. FIG. 5E shows a read gate signal 132 upon retrying. In this case, the read gate signal 132 is turned on from L to H synchronously with the read data of the second pilot pattern PLO2. The read data 126 of the second sync byte pattern SB2 is detected as shown in FIG. 5F. When the read data 126 of the second sync byte pattern SB2 can be normally detected, the second data DATA2 and ECC are normally demodulated from the read data 128 and 130. The first data DATA1 lost by the loss of the sync byte pattern SB1 is reconstructed from the demodulated ECC and the reading operation can be normally finished. The retrying processes in FIGS. 5E and 5F are repeated by only a predetermined number of retrying times until the data can be normally demodulated by the detection of the second sync byte pattern SB2. Normally, the data length DL is defined so that the loss by the thermal asperity of the MR head lies within the range of the first data DATA1 and even if the first sync byte pattern SB1 is lost, the second sync byte pattern SB2 located at the back position can be detected. Therefore, the loss of the second sync byte pattern SB2 subsequent to the loss of the first sync byte pattern SB1 can be regarded as a data loss due to causes other than the TA of the MR head. Thus, by reading the data again at the time of retry, the read data 126 of the second sync byte pattern SB2 is certainly obtained as shown in FIG. 5F. Each data is demodulated from the read data 128 of the second data DATA2 and the read data 130 of the ECC, the lost first data DATA1 is finally reconstructed from the ECC, and the reading operation can be normally finished. Further, with respect to the time of retry in FIG. 5F when the first sync byte pattern SB1 in FIG. 5D is lost or when both of the first sync byte pattern SB1 and second sync byte pattern SB2 are lost, after the reading operation is normally finished, the sector is regarded as a defective sector. Sector data is stored into an empty sector of a predetermined alternating cylinder of the disk medium and is registered into a sector alternating table on the controller. Furthermore, even if the first sync byte pattern SB1 can be detected, when the second sync byte pattern SB2 cannot be correctly demodulated at the correct position, the sector is regarded as a defective sector and it is desirable to perform an alternating process for the alternating sector. Therefore, after that, in response to an access to the same defective sector, the alternating sector is accessed on the basis of the contents in the alternating table. Therefore, the sector in which the loss by the thermal asperity of the MR head once occurred is eliminated from the access target sector, thereby making it possible to prevent the growth of the defective sector by the thermal asperity of the MR head.

Figure 6B:
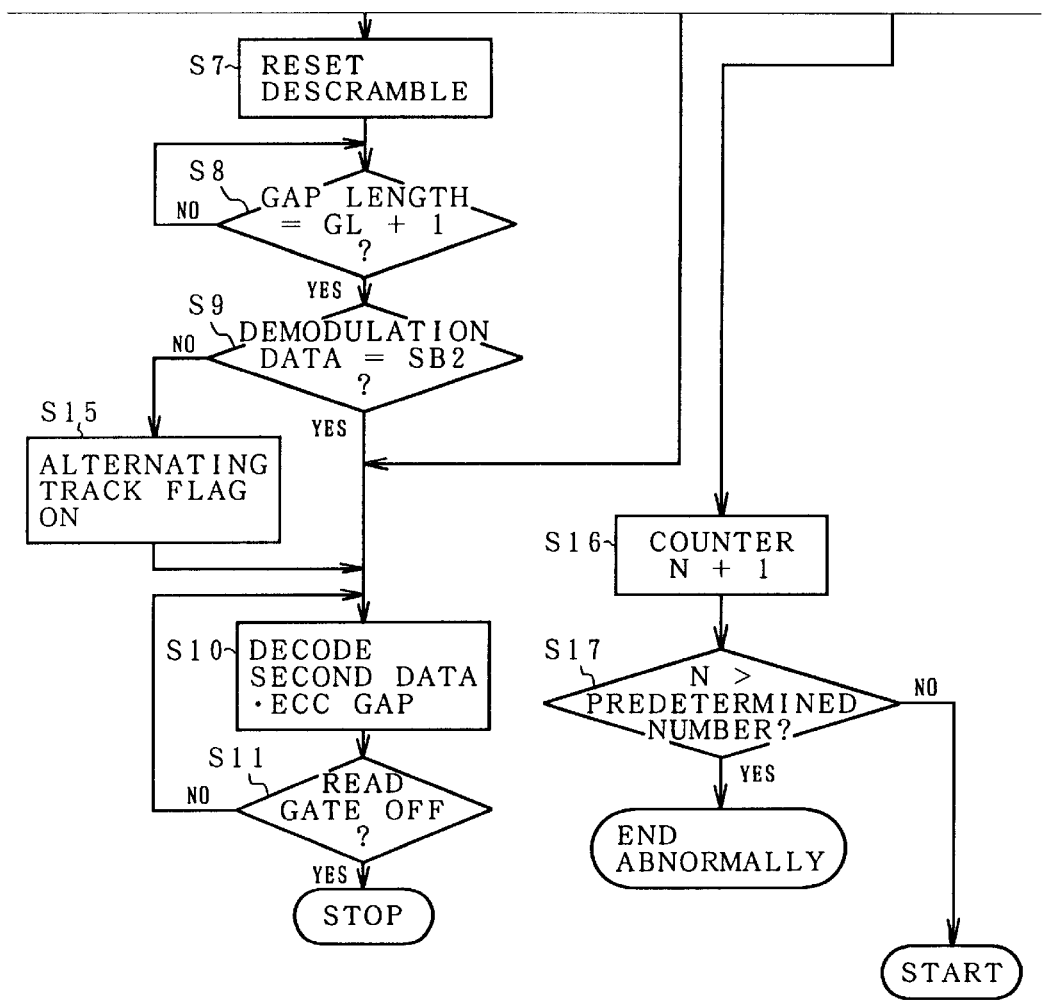

FIGS. 6A and 6B are flowcharts for the reading operation at the time of the normal reading operation, the loss of the first sync byte pattern SB1, and the loss of the first and second sync byte patterns SB1 and SB2 in FIGS. 5A to 5F. The reading operation is shown as an example in the case where the data, ECC, and gap have been scrambled upon writing of the medium, so that a descrambling process is executed upon reading. Unless the scrambling process is performed upon writing of the medium, the process regarding the descramble is unnecessary. The reading operation is started from a position where the hard disk controller 22 turns on a read gate in an interval of the first pilot pattern PLO1. The read channel 20 discriminates whether the read gate is ON in step S1. If YES, first in step S2, a descrambling and a resetting for initialization of a counter (N) are executed. In step S3, a check is made to see if the first sync byte pattern SB1 can be detected. When it can be detected, in step S4, the first sync byte pattern SB1 is formed in the NRZ data as data of HDCIF. In step S5, the decoding and descrambling of the first data DATA1 are started. In step S6, a check is made to see if the data length has reached the preset data length DL. The first data DATA1 is decoded until the data length reaches the data length DL. When the data length DL reaches DL+1, step S7 follows and the descrambling is reset. The processing routine advances to step S8 and a check is made to see if the demodulated data is the second sync byte pattern SB2. In this instance, a check is made to see if it can correctly be demodulated at the position where the second sync byte pattern SB2 was written. In step S10, the demodulation of the second data DATA2, ECC, and gap and the descrambling are repeated until the read gate is turned off in step S11. Subsequently, processes when the first sync byte pattern SB1 is lost are executed in accordance with the order of the processes in steps S12, S13, S14, S10, and S11. When the second sync byte pattern SB2 is detected in step S12, step S13 follows and an alternating flag is turned on. The alternating flag is a flag indicating that the first sync byte pattern SB1 is not normally detected and the second sync byte pattern SB2 was detected. This flag is used for a discrimination when setting to the alternating sector after the reading process. In step S14, the second sync byte pattern SB2 to transfer to the hard disk controller 22 is formed. After that, the second data DATA2, ECC, and gap signal are decoded and descrambled and the resultant data is transferred to the hard disk controller 22 and the process is finished. Further, processes in the case where both of the first sync byte pattern SB1 and second sync byte pattern SB2 are lost are executed in steps S16 and S17. That is, when the read gate is turned on in the first pilot pattern PLO1 and the reading operation is not finished, the data is again read. As a method of reading again, a case where the hard disk controller 22 again turns on the read gate in the interval of the first pilot pattern PLO1 and a case where it turns on the read gate in the interval of the second pilot pattern PLO2 are considered. Reading algorithms of the read channel 20 in this instance with respect to both of the above cases are based on the same sequence. When the first sync byte pattern SB1 and second sync byte pattern SB2 cannot be detected, the counter (N) is increased by 1 (N→N+1) in step S16. In step S17, a check is made to see if the number of retrying times is equal to a predetermined number. When (N) is equal to or less than the predetermined number, the processing 94 routine is returned to START and is restarted from the step in which the hard disk controller 22 turns on the read gate in the first pilot pattern PLO1 or second pilot pattern PLO2. When the data cannot be read even when the reading operation is performed by a predetermined number of times, the processing routine is finished as an abnormality.

FIGS. 7A to 7F are time charts when another medium data format is read in the magnetic disk apparatus of the invention. The embodiment is characterized in that the training patterns TR1 and TR2 which are used for control of an automatic equalizer of the automatic equalizing type maximum likelihood detecting circuit 76 provided for the read channel 20 in FIG. 2B are eliminated. That is, it relates to a case where, for example, fixed values adjusted upon shipping from the factory are used as an automatic equalizing type maximum likelihood detecting circuit 76 of the read channel 20 in FIG. 2B. Therefore, it is unnecessary to automatically set the tap coefficients by the training signal when the disk medium is read. For this purpose, in a medium data format of FIG. 7A, the first training field 104 and second training field 112 in FIG. 5A are eliminated and the first training pattern TR1 and second training pattern TR2 are not recorded. The other format construction is the same as that of FIG. 5A.

Figure 8:
FIG. 8 is an explanatory diagram of use patterns of a medium data format without the training and an HDC format.

FIG. 8 shows a specific pattern example of each field written in the medium data format without training in FIG. 7A. In a manner similar to the pattern with training in FIG. 4, a pattern (C) is shown while dividing into "HDCIF" as a pattern on the interface with the hard disk controller and "MEDIA" as a pattern on the disk medium. The pattern (C) is a pattern obtained by eliminating the first and second training patterns TR1 and TR2 from the pattern (B) in FIG. 4. The data lengths of the first and second pilot patterns and the first data DATA1 are the same as those in FIG. 4. Further, although the data length of each of the first and second sync byte patterns SB1 and SB2 is equal to at least one byte, in order to raise a redundancy of the sync byte detection, it is also possible to raise the number of bytes of each of the first sync byte pattern SB1 and the second sync byte pattern SB2 and to use those patterns. It will be obviously understood that in a manner similar to the case of FIG. 4, each of the first and second sync byte patterns SB1 and SB2 is set to one byte and the sector lengths are reduced by lengths corresponding to the eliminated training patterns TR1 and TR2, thereby raising a format efficiency.

Referring again to FIGS. 7A to 7F, FIGS. 7B and 7C show the read gate signal 82 and read data at the time of the normal reading and are fundamentally the same as those in the cases with the training patterns in FIGS. 5B and 5C. FIG. 7D shows the read data when the first sync byte pattern SB1 is lost and is the same as that in FIG. 5D. Further, FIGS. 7E and 7F show the read gate signal and read data at the time of retry when the first and second sync byte patterns SB1 and SB2 are lost and this point is also the same as that in FIGS. 5E and 5F.

[Data split]

The magnetic disk apparatus of the invention uses a data surface servo system in which servo patterns are arranged in the radial direction every predetermined rotational angle of a data surface of the disk medium. Therefore, there is used a data split format such that when writing as shown in FIGS. 3A to 3C, if a servo region exists in a writing sector region, write data is divided into two data and written.

FIG. 9A shows a split format of the medium data and a write sector is divided into two portions and written into a first sector region 134 and a second sector region 138 before and after a servo field 136. In the invention, a split format of the sync byte pattern is applied to each of the divided first and second sector regions 134 and 138. That is, with respect to the first sector region 134 before the servo field 136, there are provided the gap field 101, first pilot field 102, first training field 104, first sync byte field 106, first data field 108, second pilot field 110, a second training field 112, second sync byte field 114, and second data field 116. As for the second sector region 138 of the latter half subsequent to the servo field 136 as well, there are provided a gap field 139, a first pilot field 140, a first training field 142, a first sync byte field 144, a third data field 146, a second pilot field 148, a second training field 150, a second sync byte field 152, a fourth data field 154, and further, the ECC field 118. The first pilot pattern PLO1, first training pattern TR1, first sync byte pattern SB1, second pilot pattern PLO2, second training pattern TR2, and second sync byte pattern SB2 are stored in each field of the first and second sector regions 134 and 138 excluding the data fields. The write data is divided into former and latter write data by the split by the servo field 136. The former half write data is divided into the first data DATA1 and second data DATA2 and written into the first data field 108 and second data field 116 in the first sector region 134. The divided latter half write data is divided into third data DATA3 and fourth data DATA4 and written into the third data field 146 and fourth data field 154 in the second sector region 138. The data lengths and patterns of the other fields excluding the data fields 108, 116, 146, and 154 of the first and second sector regions 134 and 138 which were divided into the former and latter regions by the servo field 136 are the same as those of the format in the case where the data split of FIG. 5A is not performed. With respect to the write data, the data length of each of the first and third data DATA1 and DATA3 of the first and third data fields 108 and 146 is set to a length which is equal to or larger than the length of data lost by the thermal asperity of the MR head and is equal to or less than the correctable data length of ECC, for example, to the same length as ten bytes. On the other and, the data length of the second data DATA2 of the second data field 116 is equal to the data length obtained by subtracting 10 bytes as a data length of the first data DATA1 from the divided former half write data. Similarly, the data length of the fourth data DATA4 of the fourth data field 154 is equal to the data length obtained by subtracting 10 bytes of the third data DATA3 of the third data field 146 from the divided latter half write data.

FIGS. 9B and 9C show the read gate signal and read data at the time of the normal reading of the split medium data format in FIG. 9A. The read gate signal in FIG. 9B is divided into a read gate signal 82-1 which rises to the H level by the reading of the first sector region 134 of the former half of the servo field 136 and a read gate signal 82-2 which is raised to the H level at the timing of the latter second sector region 138 of the servo field 136. As mentioned above, the read channel 20 operates in response to the read gate signals 82-1 and 82-2 which are generated at the former and latter timings of the servo field 136, respectively. As shown in FIG. 9C, as read data of the former half first sector region 134, the read data 122 of the first data DATA1 is demodulated on the basis of the read data 120 of the first sync byte pattern SB1. After the read data 124 and 126 were skipped on the basis of the gap data length GL, the second data DATA2 is demodulated from the read data 128. As for the later half second sector region 138 as well, in a manner similar to the above, when the first sync byte pattern SB1 is detected from read data 156, on the basis of the turn-on to the H level of the read gate signal 82-2, the third data DATA3 as much as the data length DL is demodulated from the read data 158. Read data 160 and 162 are skipped by a length corresponding to the gap data length GL. After that, the fourth data DATA4 is demodulated from read data 164 and the ECC is finally demodulated from the read data 130.

FIGS. 10A to 10D relate to a case where with respect to the split format of the medium data of FIG. 10A, the first sync byte pattern SB1 is lost in the first sector region 134 before or the second sector region 138 after the servo field 136. In this case, as shown in FIG. 10B, the read gate signals 82-1 and 82-2 are turned on to the H level in correspondence with the first sector region 134 and second sector region 138 and the reading operation of the read channel 20 is executed. When the first sync byte pattern SB1 in the first sector region 134 is lost, the data becomes as shown in FIG. 10C. That is, as for the first sector region 134, the read data 120 of the first sync byte pattern SB1 is not obtained but the read data 126 of the second sync byte pattern SB2 is derived. The second sync byte pattern SB2 is first detected. Therefore, the second data DATA2 is demodulated from the read data 128. As for the second sector region 138, since the first sync byte pattern SB1 can be normally detected from the read data 156, the third data DATA3, fourth data DATA4, and further, the ECC are demodulated. The first data DATA1 lost by the loss of the first sync byte pattern SB1 is reconstructed from the ECC and the reading operation is normally finished. FIG. 10D relates to a case where the first sync byte pattern SB1 of the latter half second sector region 138 is lost. In this case, since the first sync byte pattern SB1 can be normally detected from the read data 120 with regard to the first sector region 134 of the former half, the first data DATA1 and second data DATA2 are demodulated. With respect to the next second sector region 138, the read data 156 of the first sync byte pattern SB1 is not derived due to the loss and the second sync byte pattern SB2 is first detected from the read data 162. Thus, the fourth data DATA4 and ECC are demodulated from the read data 164 and 130. The lost third data is reconstructed from the demodulated ECC and the reading operation is normally finished.

FIGS. 11A to 11D show the retrying operation in the case where with respect to the split format of the medium data of FIG. 11A, the first and second sync byte patterns SB1 and SB2 in the first sector region 134 are lost or the case where the first and second sync byte patterns SB1 and SB2 in the second sector region 138 are lost. First, in the split format of the medium data of FIG. 11A, when the first and second sync byte patterns SB1 and SB2 of the former half first sync region 134 of the servo field 136 cannot be detected and the retrying operation is performed, the read gate signal is generated as shown in FIG. 11B. That is, on the basis of the read data of the pilot pattern PLO2 of the second pilot field 110 in the first sector region 134, a read detection signal 82-3 is turned on to the H level and the read channel 20 is made operative. The second sync byte pattern SB2 is detected from the read data 126 in FIG. 11C and the data DATA2 is demodulated from the read data 128. As for the next second sector region 138, since the first sync byte pattern SB1 can be detected from the read data 156, the third data DATA3, fourth data DATA4, and ECC are normally demodulated. The first data DATA1 which could not be demodulated is reconstructed by the demodulated ECC. The reading operation is normally finished. When the retrying operation is carried out by the loss of the first and second sync byte patterns SB1 and SB2 in the second sector region 138 after the servo field 136 in FIG. 11A, the data becomes the read data in FIG. 11D. The read gate signals in this instance are set like read gate signals 82-1 and 82-4 shown by broken lines in FIG. 11B. Although the read gate signal 82-1 is the same as that in the normal reading mode, the read signal 82-4 of the latter second sector region 138 is raised to the H level from the read data of the second pilot pattern PLO2 of the second pilot field 148 and the read channel is made operative. As shown in the latter half in FIG. 11D, the second sync byte pattern SB2 in the second sector region 138 is detected from the read data 162 and the fourth data DATA4 and ECC are demodulated. The third data DATA3 is reconstructed from the demodulated ECC and the reading operation is normally finished. As for the retrying process in this case as well, when the sector data cannot normally be read even if the retrying operation was executed by a preset number of times, the processes are finished as an abnormality.

FIGS. 12A to 12C are time charts for the normal reading when the data split due to the servo field occurs with regard to the medium data format having no training pattern. FIG. 12A shows the split format of the medium data without a training pattern and shows the format obtained by eliminating the recording fields of the first and second training patterns TR1 and TR2 from FIG. 9A. FIG. 12B shows the read gate signals 82-1 and 82-2 at the time of the normal reading. Thus, the fourth data DATA4 and, further, the ECC can be reconstructed from the first data DATA1 by the read data at the time of normal as shown in FIG. 12C.

FIGS. 13A to 13D are time charts in the case where the first sync byte pattern SB1 is lost in either one of the former and latter sectors in the split format of the medium data having no training pattern. In a manner similar to FIGS. 12A to 12C, the split format of the medium data in FIG. 13A does not have any field of the training pattern and the reading operations of the read channel according to the read gate signals 82-1 and 82-2 upon reading in FIG. 13B are executed. In the reading operation, as shown in FIG. 13C, when the first sync byte pattern SB1 cannot be detected due to the loss by the read data 120 of the first sector region 134 before the servo field 136, the second sync byte pattern SB2 is first detected from the read data 126 and the second data DATA2 is demodulated. With respect to the next second sector region 138, since the first sync byte pattern SB1 can normally be detected from the read data 156, the third data DATA3, fourth data DATA4, and ECC are demodulated. The lost first data DATA1 is reconstructed from the demodulated ECC and the reading operation can be normally finished. When the second sync byte pattern SB2 in the second sector region 138 after the servo field 136 in FIG. 13A cannot be detected, the read data as shown in FIG. 13D is derived. As for the first sector region 134 before the servo field, since the first sync byte pattern SB1 can be normally detected from the read data 120, the first data DATA1 and second data DATA2 are normally demodulated. With respect to the next second sector region 138, the first sync byte pattern SB1 cannot be detected due to the loss of the read data 156, the second sync byte pattern SB2 is first detected from the read data 162, and the fourth data DATA4 and ECC are demodulated. The lost third data DATA3 is reconstructed from the demodulated ECC and the reading operation is normally finished.

FIGS. 14A to 14D show a case where with respect to the case without a training in the split format of the medium data of FIG. 14A, both of the first and second sync byte patterns SB1 and SB2 are lost in either the first sector region 134 or second sector region 138 and the retrying operation was performed. First, in the case where the first and second sync byte patterns SB1 and SB2 in the first sector region 134 before the servo field 136 are lost and the retrying operation is executed, the read gate signals 82-3 and 82-2 in FIG. 14B are obtained. That is, with respect to the first sector region 134 in which the first and second sync byte patterns SB1 and SB2 are lost, the read gate signal 82-3 is set from the L level to the H level by the second pilot signal PLO2 of the second pilot field 110. As shown in FIG. 14C, the second sync byte pattern SB2 is detected from the read data 126 and the second data DATA2 is demodulated. Operations similar to those at the time of normal are executed with regard to the next second sector region 138, the third data DATA3, fourth data DATA4, and ECC are demodulated from the read data, the lost first data DATA1 is reconstructed by the ECC, and the reading operation by the retry is normally finished. When the first and second sync byte patterns SB1 and SB2 in the latter second sector region 138 in FIG. 14A are lost and the retrying operation is executed, the read gate signals 82-1 and 82-4 are generated as shown by broken lines in FIG. 14B. In this case, as shown in FIG. 14D, as for the first sector region 134, the first data DATA1 and second data DATA2 are demodulated in a manner similar to the normal case. With respect to the next second sector region 138, the read gate signal 82-4 is turned on to the H level by the detection of the second pilot pattern PLO2 in the second pilot field 148. Therefore, the second sync byte pattern SB2 is first detected by the read data 162 as shown in FIG. 14D and the fourth data DATA4 and ECC are demodulated. Finally, the lost third data DATA3 is reconstructed from the demodulated ECC and the reading operation by the retry is normally finished.

[On the fly]

The magnetic disk apparatus of the invention can also correspond to "on the fly" in which the read data demodulated by the read channel 20 in FIG. 1 is continuously transferred from the interface circuit 28 to the host side while performing the error detection and correction in a real-time manner by the ECC circuit 25 of the hard disk controller 22. FIG. 15A shows a medium data format in the magnetic disk apparatus corresponding to "on the fly" according to the invention and relates to an example in the case having training patterns and is substantially the same as FIG. 5A. In the reading operation corresponding to "on the fly" of such a medium data format, the read gate signal 82 in FIG. 15B is turned on from the L level to the H level by the detection of the first pilot signal PLO1 in the first pilot field 102 and is turned off to the L level by the detection of a gap pattern in the gap field 101 of the next sector head subsequent to the ECC field 118 at the end of the sector. The read channel 20 in FIG. 1 operates on the basis of the turn-on to the H level of the read gate signal 82, thereby obtaining read data at the time of normal as shown in FIG. 15C. The read data at the time of normal is also the same as that in case of FIG. 5C with respect to "on the fly". When a loss of the first sync byte pattern SB1 subsequently occurs, read gate signals 82-5 and 82-6 as shown in FIG. 15D are generated and the read data in this instance as shown in FIG. 15E is derived. The read gate signal 82-5 at the time of the loss of the first sync byte pattern SB1 in FIG. 15D is turned on to the H level by the detection of the first pilot pattern PLO1 in the first pilot field 102. After that, the specified number of bytes up to the middle of the first data field 108 passing through the first sync byte field 106 in which the first sync byte pattern SB1 has been stored is set into a register. When the first sync byte pattern SB1 cannot be detected even when the number of bytes reaches the specified number of bytes, the read gate signal 82-5 is turned off from the H level to the L level. By the turn-off to the L level of the read gate signal 82-5, the loss of the first sync byte pattern SB1 can be recognized in the hard disk controller 22 having the ECC circuit 25 which executes the error detection and correction by "on the fly", thereby enabling the lost first data DATA1 to be corrected by the correspondence to "on the fly". Subsequently, the signal is turned on from the L level to the H level as shown in the read gate signal 82-6 by the detection of the pilot signal PLO2 in the second pilot field 110. Thus, as shown in FIG. 15E, the second sync byte pattern SB2 is detected from the read data 126, the second data DATA2 is demodulated from the read data 128 of the first byte, and further, the ECC is demodulated from the read data 130. The demodulated data of the second data DATA2 and ECC is received by the hard disk controller 22 in FIG. 1. The lost first data DATA1 is reconstructed while performing the data transfer to the upper apparatus by the built-in ECC circuit 25 and the reading operation of "on the fly" is normally finished.

FIGS. 16A to 16E show the reading operation corresponding to "on the fly" in the case where there is no training pattern like a medium data format of FIG. 16A. That is, at the time of the normal reading, the demodulation from the read data as shown in FIG. 16C is performed by the read gate signal 82 in FIG. 16B and this point is substantially the same as those in the cases of FIGS. 15B and 15C. When the first sync byte pattern SB1 is lost, the demodulation of the read data in FIG. 16E by the read gate signals 82-5 and 82-6 in FIG. 16D is executed. This point is also substantially the same as those in FIGS. 15D and 15E corresponding to "on the fly". There is only a different point that the medium data format does not have the training patterns TR1 and TR2.

FIGS. 17A to 17D show the reading operation in the case where in the magnetic disk apparatus of the invention corresponding to "on the fly", the first sync byte pattern SB1 in the first sector region 134 before the servo field 136 is lost in the split format of the medium data of FIG. 17A or the first sync byte pattern SB1 in the second sector region 138 after the servo field 136 is lost. First, when the sync byte pattern SB1 in the first sector region 134 in FIG. 17A is lost, read gate signals 82-5, 82-6, and 82-7 in FIG. 17B are generated. That is, the read gate signal 82-5 is turned on to the H level by the first pilot pattern PLO1 in the first pilot field 102 in the first sector region 134. In this state, when the first sync byte pattern SB1 cannot be detected even if the number of bytes reaches the specified number of bytes, the read gate signal 82-5 is turned off to the L level. Subsequently, the signal is turned on to the H level like a read gate signal 82-6 by the detection of the second pilot pattern PLO2 in the second pilot field 110. Thus, as shown in FIG. 17C, the second sync byte pattern SB2 in the first sector region 134 is detected from the read data 126 and the second data DATA2 can be demodulated. As for the next second sector region 138, since the first sync byte pattern SB1 can normally be detected from the read data 156, the third data DATA3, fourth data DATA4, and ECC can be demodulated. The turn-off to the L level of the read gate signal 82-5 is recognized by the hard disk controller 22 at the post stage. The loss of the first sync byte pattern SB1 in the first sector region 134 by the read data 120 is recognized. Therefore, the ECC circuit 25 prepares a reconstructing process of the lost first data DATA1, receives the subsequent second data DATA2, third data DATA3, fourth data DATA4, and further, ECC, and reconstructs the lost first data DATA1 in correspondence with "on the fly". When the sync byte pattern SB1 in the second sector region 138 in FIG. 17A is lost, a read gate signal as shown by a broken line in FIG. 17B is derived. That is, as for the first sector 134, the read gate signal 82 similar to that in FIG. 16B is derived. The first data DATA1 and second data DATA2 are normally demodulated on the basis of the detection of the first sync byte pattern SB1 as shown in FIG. 11D. With respect to the next second sector region 138, as shown in a read gate signal 82-8 in FIG. 17B, the signal is turned off to the L level when the first sync byte pattern SB1 is not obtained even after the elapse of time corresponding to the specified number of bytes from the detection of the first pilot pattern PLO1 in the second sector region 138. The signal is turned on to the H level like a read gate signal 82-9 by the detection of the next second pilot pattern PLO2. The second sync byte pattern SB2 is detected from the read data 162 as shown in the latter half in FIG. 17D. Thus, the fourth data DATA4 and ECC are normally demodulated. When the read gate signal 82-8 is turned off to the L level, the loss of the first sync byte pattern SB1 in the second sector region 138 is recognized by the ECC circuit 25 of the hard disk controller 22 at the post stage. The lost third data DATA3 is reconstructed in correspondence to "on the fly" from the first and second data DATA1 and DATA2 which have already been obtained and from the fourth data DATA4 and ECC which are subsequently obtained. The reconstructed third data DATA3 is transferred to the upper apparatus.

FIGS. 18A to 18D show the reading operation for the loss of the first sync byte pattern SB1 in the case where in the magnetic disk apparatus of the invention corresponding to "on the fly", no training pattern is provided with respect to the split format of the medium data as shown in FIG. 18A. As for the reading operation of the split format of the medium data having no training pattern, a read gate signal in FIG. 18B, read data at the time of the loss of the first sync byte pattern SB1 in FIG. 18C, and read data at the time of the loss of the second sync byte pattern SB2 in FIG. 18D which are similar to those in FIGS. 17B, 17C, and 17D are obtained.

Figure 19:
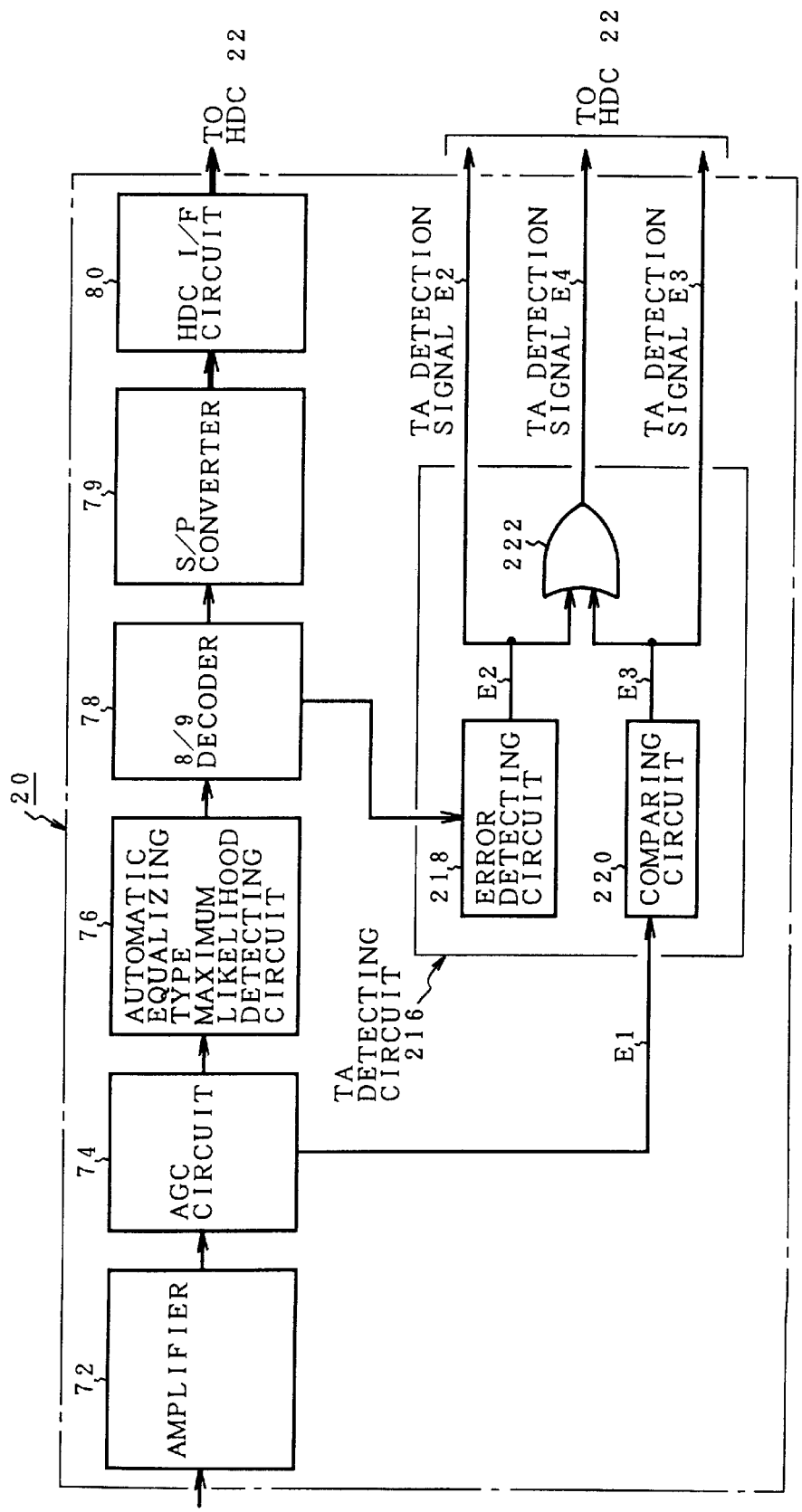
FIG. 19 is a block diagram of the read channel in FIG. 1 having a detecting function of a loss of data by a thermal asperity of an MR head.

FIG. 19 shows another embodiment of the read channel 20 in FIG. 1 as a magnetic disk apparatus corresponding to "on the fly" of the invention and is characterized in that a loss occurring due to the thermal asperity of the MR head is detected and can be notified to the hard disk controller 22. That is, in the reading operation corresponding to "on the fly" in FIGS. 15A to 15E, as shown in FIG. 15D, the hard disk controller 22 in FIG. 1 recognizes the loss of the first sync byte pattern SB1 by the turn-off to the L level of read gate signal 82-5 when the first sync byte pattern cannot be detected. On the other hand, in the embodiment of the read channel 20 in FIG. 19, the loss of the sync byte pattern SB1 by the thermal asperity of the MR head is directly detected and notified to the hard disk controller 22, thereby enabling the correcting operation corresponding to "on the fly" to be performed by the ECC circuit 25. In FIG. 19, in a manner similar to the embodiment of FIG. 2B, the circuits in a range from the amplifier 72 to the HDC interface circuit 80 for reading are provided for the read channel 20. In addition to them, a TA detecting circuit 216 is newly provided. The TA detecting circuit 216 is made up of: an error detecting circuit 218 for detecting an error of the decoding operation of the 8/9 decoder 78; a comparing circuit 220 for detecting a loss interval due to a fluctuation of a base line by TA due to the contact between the MR head and the disk medium from a read signal E1 of the AGC circuit 74; and an OR circuit 222 for getting the OR of output signals E2 and E3 from the error detecting circuit 218 and comparing circuit 220 and generating a TA detection signal E4 to the hard disk controller 22.

Figure 20:
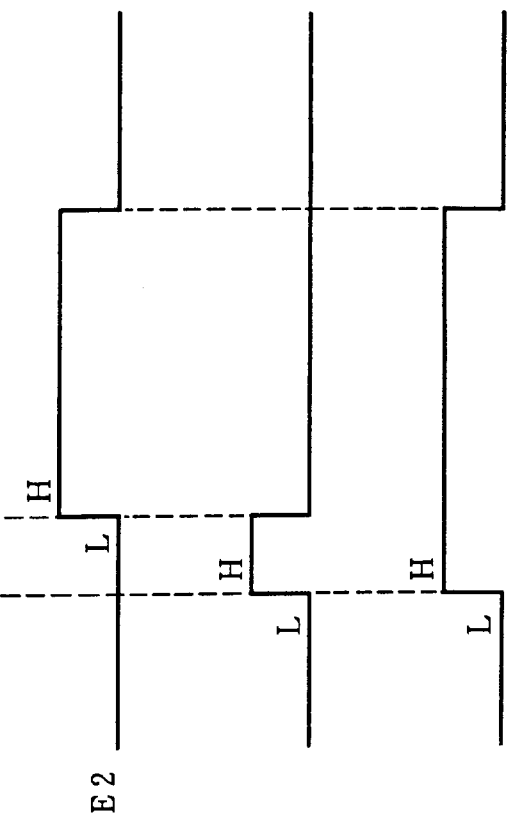
FIGS. 20A to 20D are time charts for the detection of loss in FIG. 19.

FIGS. 20A to 20D are time charts for the TA detecting circuit 216 in FIG. 19. First, FIG. 20A shows the read signal E1 from the AGC circuit 74. The base line of the read signal E1 largely fluctuates by the thermal asperity of the MR head and a loss interval in which a read waveform is saturated occurs. When such a fluctuation of the base line of the read signal E1 by such a TA occurs, conditions of an input code in the 8/9 decoder 78 are released and an abnormality occurs. The decoding error detection signal E2 as shown in FIG. 20B is generated. In response to the fluctuation of the read signal E1 due to the thermal asperity of the MR head, the comparison output signal E3 by the comparing circuit 220 as shown in FIG. 20C is generated. The OR circuit 222 gets the OR between the decoding error detection signal E2 and an inversion signal of the comparing circuit 216 and supplies the TA detection signal E4 in FIG. 20D to the hard disk controller 22. That is, the TA detection signal E4 is outputted to the hard disk controller 22 as a detection signal indicative of an abnormality from the start of a level fluctuation caused due to the thermal asperity of the MR head by the read signal E1 to the end of the decoding error of the 8/9 decoder 78. Therefore, the hard disk controller 22 recognizes the detection of the abnormality due to the thermal asperity of the MR head, receives the TA detection signal E4 indicative of a detecting state of the 8/9 decoder error, and recognizes the loss of the first sync byte pattern SB1 before the read gate signal 82-5 in FIG. 15D is turned off to the L level. The hard disk controller 22 can activate the error correcting operation corresponding to "on the fly" by the ECC circuit 25 of the first data DATA1 subsequent to the first sync byte pattern SB1.

[Scramble and descramble]

Figure 21:
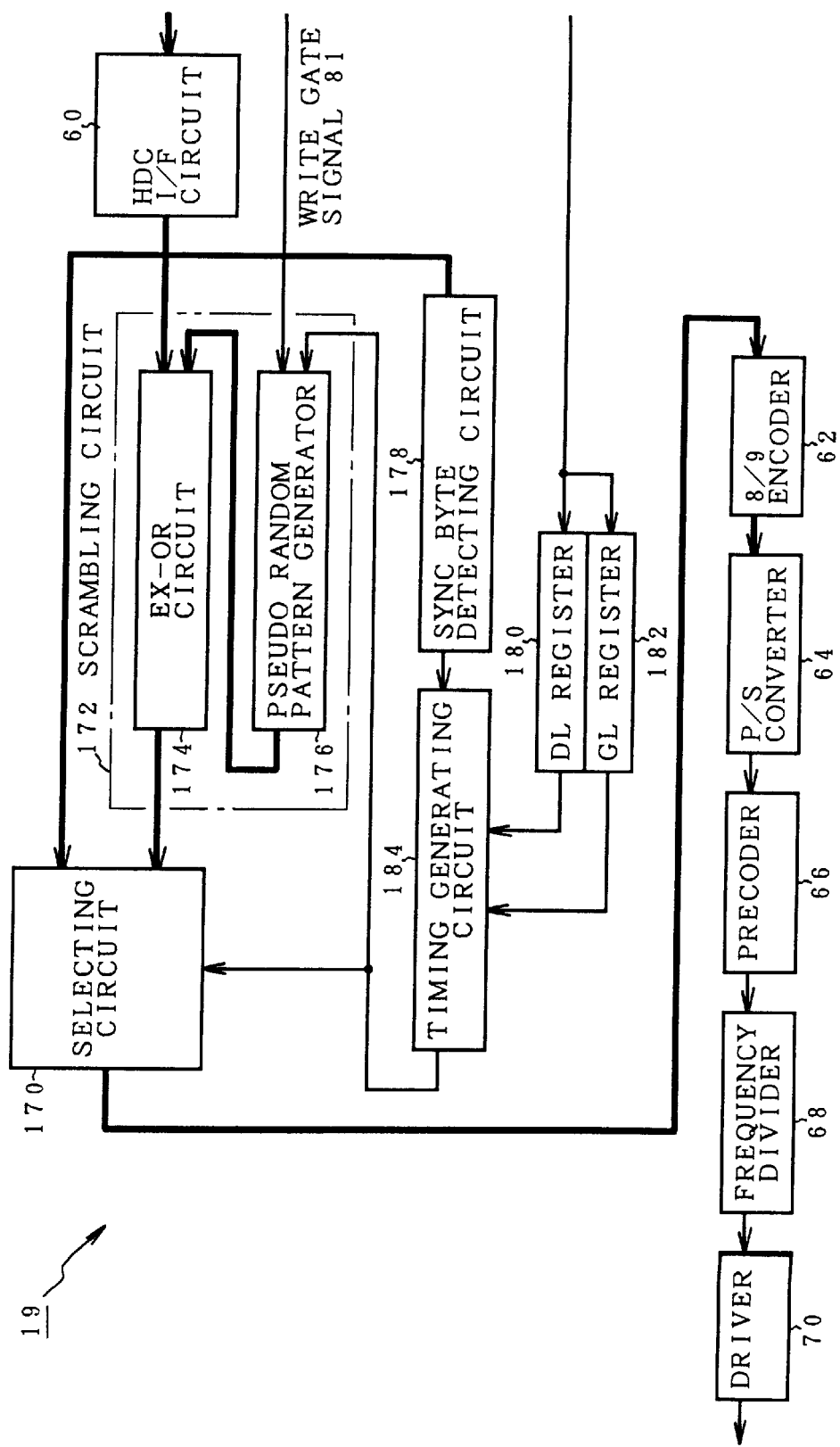
FIG. 21 is a block diagram of the write channel in FIG. 1 when write data is scrambled.

FIG. 21 shows another embodiment of the write channel 19 in FIG. 1. The embodiment is characterized in that data, ECC, and gap pattern to be written to the disk medium are scrambled. In a manner similar to the embodiment of FIG. 2A, the write channel 19 is made up of the HDC interface circuit 60 for writing, 8/9 encoder 62, parallel/serial converter 64, precoder 66, frequency divider 68, and driver 70. A circuit function to scramble the data, ECC, and gap pattern is provided between the HDC interface circuit 60 for writing and the 8/9 encoder 62. That is, a scrambling circuit 172 is provided after the HDC interface circuit 60 for writing. The scrambling circuit 172 has an EX-OR circuit 174 and a pseudo random pattern generator 176. The pseudo random pattern generator 176 generates, for example, an M series code of a predetermined code length. The EX-OR circuit 174 gets the EX-OR between the formatted data of one sector from the HDC interface circuit 60 for writing and the pseudo random pattern, thereby scrambling. A selecting circuit 170 is provided after the scrambling circuit 172. The data from the HDC interface circuit 60 for writing and the data scrambled by the scrambling circuit 172 are inputted to the selecting circuit 170. Either one of these is selected and inputted to the 8/9 encoder 62. The selecting circuit 170 selects the data scrambled by the scrambling circuit 172 at a timing of the write data ECC and gap pattern. At the other timings, the selecting circuit 170 selects the data from the HDC interface circuit 60 for writing, namely, the data which is not scrambled. The selecting operation of the selecting circuit 170 and the generation of the pattern of the pseudo random pattern generator 176 are controlled by a timing generating circuit 184. A sync byte detecting circuit 178, a DL register 180, and a GL register 182 are provided for the timing generating circuit 184. The sync byte detecting circuit 178 detects the first and second sync byte patterns SB1 and SB2 included in the formatted write data derived from the HDC interface circuit 60 for writing and outputs them. The data length DL of the first data DATA1 subsequent to the first sync byte pattern SB1 has been set in the DL register 180. An interval of the first data DATA1 according to the data length DL set in the DL register 180 is set from the timing when the sync byte detecting circuit 178 detects the first sync byte pattern SB1. The gap data length GL from the end of the first data DATA1 to the beginning of the next second data DATA2 has been set in the GL register 182. In response to those lengths, the timing generating circuit 184 sets a scrambling period of time for an interval of the second data DATA2, ECC, and next gap pattern. Timing signals indicative of the timings of the first data, second data, ECC, and gap pattern to be scrambled which are generated from the timing generating circuit 184 are also given to the pseudo random pattern generator 176. A pseudo random pattern is generated from the pseudo random pattern generator 176 to the EX-OR circuit 174 synchronously with an output selection from the scrambling circuit 172 of the selecting circuit 170, thereby enabling the scrambled data to be supplied to the selecting circuit 170.

Figure 22A:
FIGS. 22A to 22E are time charts for a scrambling operation in FIG. 21.
Figure 22B:
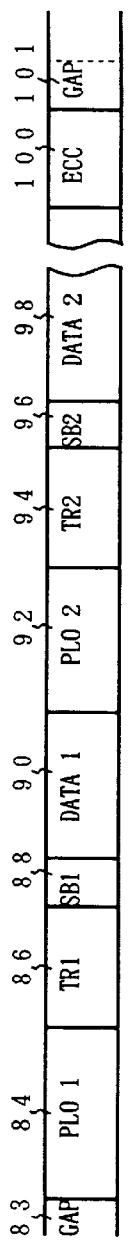

FIGS. 22A to 22E are time charts for the scrambling process of the write channel 19 in FIG. 21. First, when the write gate signal 81 in FIG. 22A is turned on, the pseudo random pattern generator 176 of the scrambling circuit 172 is made operative. In this state, the write data according to the HDC data format as shown in FIG. 22B is inputted to the write channel 19 through the HDC interface circuit 60 for writing.

Figure 22C:
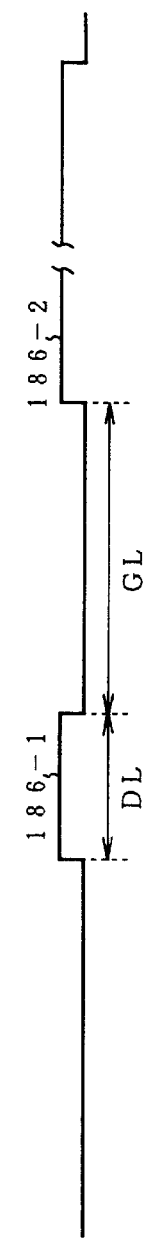
Figure 22D:

The first sync byte detecting circuit 178 detects the sync byte pattern 88 shown at SB1 and outputs a detection signal to the timing generating circuit 184. In response to it, the timing generating circuit 184 generates the timing signal to the selecting circuit 170 for an interval of the data length DL set in the DL register 180, thereby allowing the output of the scrambling circuit 172 to be selected. Since the timing signal is supplied to the pseudo random pattern generator 176, a scramble signal 188-1 in FIG. 22D is generated, so that the first data 90 shown by DATA1 is scrambled by the EX-OR circuit 174. Subsequently, the generation of the timing signal from the timing generating circuit 184 is stopped for the setting interval of the gap length GL by the GL register 182 and the pseudo random pattern generator 176 is reset. After the elapse of the gap length GL, the timing signal generating circuit 184 again generates a timing signal 186-2 as shown in FIG. 22C for an interval from the head of the second data 98 shown by DATA2 to the end of the gap data 101 after the ECC 100. Therefore, as shown in FIG. 22D, a scramble signal 188-2 is generated on the basis of the timing signal 186-2, thereby scrambling.

Figure 22E:
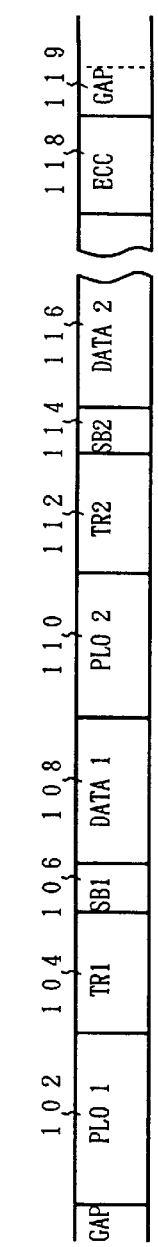

Thus, each of the first data DATA1 of the data field 108, the second data DATA2 of the second data field 116, the ECC of the ECC field 118, and further, the gap pattern GAP of the gap field 101 in the medium data format of FIG. 22E is recorded in a state in which it was scrambled.

Figure 23:
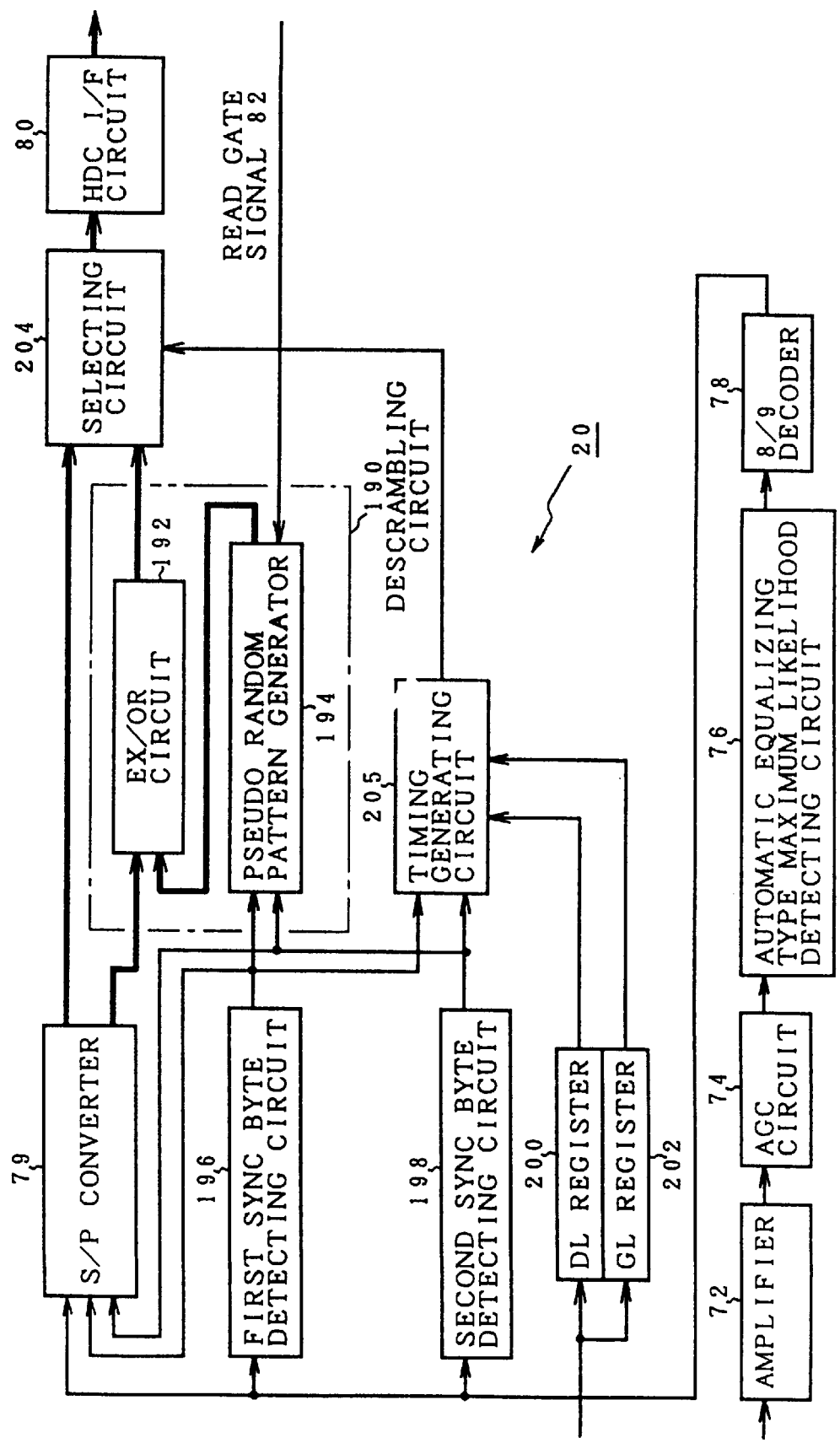
FIG. 23 is a block diagram of the read channel in FIG. 1 when read data is descrambled.

FIG. 23 is a block diagram of the embodiment having a descrambling function of the read channel 20 in FIG. 1 corresponding to the write channel 19 having the scrambling function of FIG. 21. The read channel 20 has the amplifier 72, AGC circuit 74, automatic equalizing type maximum likelihood detecting circuit 76, 8/9 decoder 78, serial/parallel converter 79, and HDC interface circuit 80 for reading in FIG. 2B. Further, a descrambling circuit 190 and a selecting circuit 204 are provided between the serial/parallel converter 79 and the HDC interface circuit 80 for reading. An EX-OR circuit 192 and a pseudo random pattern generator 194 are provided for the descrambling circuit 190 and are substantially the same as the scrambling circuit 172 in FIG. 22. The selecting operation of the selecting circuit 204 is controlled by a timing generating circuit 205. That is, the selecting circuit 204 selects an output of the descrambling circuit 190 at the timing of the first data DATA1, second data DATA2, ECC, and gap pattern included in the read data, thereby descrambling. At the other timings, the selecting circuit 204 directly selects the output of the serial/parallel converter 79, thereby cancelling the descrambling state. A first sync byte detecting circuit 196 and a second sync byte detecting circuit 198 are provided for controlling the serial/parallel converter 79, pseudo random pattern generator 194, and timing control generating circuit 205. Further, a DL register 200 in which the data length DL of the first data DATA1 has been stored and a GL register 202 in which the gap length GL from the first data DATA1 to the second data DATA2 has been stored are provided in order to control the timing generating circuit 205.

FIGS. 24A to 24F are time charts for the processing operation of the read channel 20 having the descrambling function in FIG. 23. It is now assumed that the medium format as shown in FIG. 24A was read. In the medium format, each of the first data DATA1 of the first data field 108, the second data DATA2 of the second data field 116, the ECC of the ECC field 118, and the gap pattern GAP of the gap field 119 between the present sector and the next sector has been scrambled at the time of writing as shown in the time charts of FIGS. 22A to 22E. When the reading operation is executed, as shown in FIG. 24B, the read gate signal 82 is raised to the H level by the detection of the first pilot pattern PLO1. In this state, when the first sync byte pattern SB1 is detected by the first sync byte detecting circuit 196, the signal is raised to the H level as shown in an SB1 detection signal 206 in FIG. 24C. In response to the SB1 detection signal, the timing generating circuit 205 generates a timing signal 208-1 for a data length DL of the first data DATA1 set in the DL register 200 as shown in FIG. 24D. In response to the timing signal 208-1, the selecting circuit 204 selects the output from the descrambling circuit 190. The SB1 detection signal 206 is supplied to the serial/parallel converter 79. The serial read data of the first data DATA1 is converted into the parallel data from the detection timing of the first sync byte pattern SB1. In this instance, the pseudo random pattern generator 194 generates a pseudo random pattern which coincides with a bit width of the parallel conversion to the EX-OR circuit 192. Original NRZ data is reconstructed by descrambling by an EX-OR arithmetic operation between the pseudo random pattern and the parallel data. The descrambled data in FIG. 24F is transmitted to the hard disk controller 22 through the selecting circuit 204 and HDC interface circuit 80 for reading. With respect to read data 124-1, 124-2, and 126 for an interval of the second pilot pattern PLO2, training pattern TR2, and second sync byte pattern SB2 which were set in the next gap length GL, since the timing signal is shut off, the selecting circuit 204 selects the output of the serial/parallel converter 79. The demodulated data from the 8/9 decoder 78 is directly converted into the parallel data and is transferred to the hard disk controller 22 side. The descrambling is reset here. When the second sync byte pattern SB2 is detected from the read data 126 by the second sync byte detecting circuit 198, the timing generating circuit 205 generates a timing signal 208-2 in FIG. 24D as an H level signal. The second sync byte detection signal is simultaneously supplied to the pseudo random pattern generator 194 and serial/parallel converter 79, so that the parallel conversion, the generation of the pseudo random pattern, and the selection of the selecting circuit 204 to the descrambling circuit 190 side are executed. The second data DATA2, ECC, and gap pattern in the read data 128, 130, and 119 are descrambled.

FIGS. 25A to 25E are time charts for the descrambling operation at the time of retry in which the first and second sync byte patterns SB1 and SB2 in the read channel 20 in FIG. 23 are lost. When both of the first and second sync byte patterns SB1 and SB2 cannot be detected and the retrying operation is performed in response to the reading of the medium data format of FIG. 25A, the read gate signal 132 is turned on to the H level by the reading of the second pilot pattern PLO2 in FIG. 25B. A descramble signal 214 in FIG. 25D is generated synchronously with a detection signal 212 of the second sync byte pattern SB2 in FIG. 25C. As shown in FIG. 25E, the second data DATA2 and ECC are demodulated and the lost first data DATA1 is reconstructed from the ECC.

According to the invention as described above, since the sync byte pattern is divided into two patterns, even if either one of the sync byte patterns is lost by the thermal asperity with the medium of the MR head, the other sync byte pattern can be effectively detected. Therefore, a situation such that the sector data is perfectly lost can be prevented. That is, even if one of the sync byte patterns is lost, the reading operation can be normally finished by the correcting function by the ECC and a situation such that an error which cannot be recovered is caused due to the loss of sync bytes by the thermal asperity of the MR head can be prevented.

The defect by the thermal asperity of the MR head occurs at random at the using stage of the user and grows as a sector defect. However, according to the split system of the sync bytes of the invention, when either one of the sync bytes is lost by the thermal asperity of the MR head and the reading operation is normally finished by the correction by the data and ECC due to the normal detection of the remaining sync bytes owing to the pout system of the sync bytes of the invention, by executing the alternating process for regarding the sector as a defective sector and registering the data into the alternating sector after the normal end, the defective sector caused by the thermal asperity of the MR head can be substantially recovered. The growth of the defective sector which is caused by the thermal asperity of the MR head at the using stage of the user can be certainly prevented.

Further, when the sync byte pattern is divided into two patterns, the data is also divided and distributed in correspondence with each sync byte pattern. Therefore, a format efficiency of the medium can be raised as much as possible as compared with the simple split of the sync byte pattern.

Moreover, even in the case where the write data is divided by the servo pattern at the time of writing in the data surface servo system, by applying the split format of the sync byte pattern with regard to each split sector region, for the loss of the sync byte pattern due to the thermal asperity of the MR head with respect to each split sector region which was subjected to the data split, the reading operation can be normally finished without causing an error which cannot be recovered.

In addition, as for the magnetic disk apparatus corresponding to "on the fly" in which the error detection correction by the ECC is performed while transferring the data from the read channel and the address controller to the host, the recovery for the defective sector of the thermal asperity of the MR head by the split format of the sync byte can be realized.

The invention is not limited to the foregoing embodiment but various modifications are possible so long as a sync byte split in which the sync byte pattern is divided into two patterns. The invention is not limited by the numerical values shown in the foregoing embodiment.

What is claimed is:

1. A magnetic disk apparatus for writing and reading information onto/from tracks of a medium on a sector unit basis by using a combination head having a write head and a read head, comprising:

a writing unit for forming format data including first data having a data length DL which can be corrected by an error detection correction code, a first sync byte pattern arranged just before said first data second data arranged at a predetermined gap length GL from said first data, second sync byte data arranged just before said second data, and said error detection correction code arranged subsequently to said second data, and for writing said format data onto said medium with the write head at the time of writing into a sector region;

a scrambling circuit, provided for said writing unit, for turning on a scrambling operation by a detection of said first sync byte pattern of said write format data, subsequently turning off said scrambling operation at an elapsed timing of said data length DL, again turning on said scrambling operation at a next elapsed timing of said gap length GL, subsequently turning off said scrambling operation at a sector end timing after said error detection correction code, and scrambling each of said first data, said second data, and said error detection correction code in said write format data;

a reading unit for reading out said format data including said first data having said data length DL, said first sync byte pattern arranged just before said first data, said second date arranged at said predetermined gap length GL from said first data, said second sync byte data arranged just before said second data, and said error detection correction code arranged subsequently to said second data at the time of reading out from said sector region; and subsequently demodulating said first data and said second data in the case where said first sync byte pattern is detected, and subsequently demodulating said second data and said error detection correction code in the case where said first sync byte pattern is not detected but said second sync byte pattern is detected and reconstructing said first data using said error detection correction code; and a descrambling circuit provided for said reading unit and constructed in such a manner that in the case where said first sync byte pattern of said format data is detected, a descrambling operation is turned on at the time of said detection and turned off at the elapsed timing of said data length DL, said descrambling operation being subsequently again turned on at the elapsed timing of said gap length GL and turned off at the sector end timing after said error detection correction code, thereby descrambling each of said first data, said second data, and said error detection correction code which are included in said write format data, and in the case where said first sync byte pattern of said format data is not detected but said second sync byte pattern is detected, said descrambling operation is turned on at the time of said detection and turned off at the sector end timing after said error detection correction code, thereby descrambling each of said second data and said error detection correction code which are included in said write format data.

2. An apparatus according to claim 1, wherein a data length of said first data which is arranged. subsequently to said first sync byte pattern is equal to or larger than a length of a defect that is caused by a thermal asperity of to reading head with the medium and is equal to or less than a length of data that can be corrected by said error detection correction code.

3. An apparatus according to claim 1, wherein said first sync byte pattern and said second sync byte pattern are different patterns.

4. An apparatus according to claim 1, wherein said writing unit writes a training pattern to automatically adjust a circuit constant of an automatic equalizer to an optimum value to a position before each of said first and second sync byte patterns.

5. An apparatus according to claim 1, wherein said writing unit writes a pilot pattern to synchronize a clock generating circuit provided for said reading unit with a read signal to a position before each of said first and second sync byte patterns.

6. An apparatus according to claim 1, wherein said reading head is an MR head.

7. An apparatus according to claim 1, wherein when said first sync byte pattern is detected, said reading unit skips the demodulation of said second sync byte pattern after completion of the demodulation of said first data and demodulates said second data and said error detection correction code.

8. An apparatus according to claim 1, wherein in the case where said first sync byte pattern cannot be detected or in the case where said second sync byte pattern cannot be detected at a predetermined position after the detection of said first sync byte pattern, after completion of the normal end of a reading process, said sector region is determined as a defective sector and an alternating process is executed.

9. An apparatus according to claim 1, wherein when both of said first and second sync byte patterns cannot be detected, said reading unit executes a reading process again.

10. An apparatus according to claim 9, wherein when the reading process is again performed, said reading unit turns on a read gate at a position of a second pilot pattern subsequent to said first data, starts the pattern detection, and when said second sync byte pattern is detected, said reading unit demodulates said subsequent second data and said error detection correction code and reconstructs said first data by said error detection correction code.

11. An apparatus according to claim 9, wherein said reading unit demodulates the information read by said read head while transferring said read information as a continuous data stream to an upper apparatus.

12. An apparatus according to claim 1, wherein said first and second sync byte patterns are same patterns.

13. An apparatus according to claim 11, wherein when said reading unit turns on a read gate at a position of a first pilot pattern at the head of said sector region and starts the detection of said first sync byte pattern, in the case where said first sync byte pattern cannot be detected, said reading unit turns on said read gate, turns off said read gate at a position that is away from the position of said turn-on by a predetermined data length, subsequently again turns on said read gate at a position of a second pilot pattern, and starts the detection of said second sync byte pattern, and in the case where said second sync byte pattern is detected, said reading unit demodulates said subsequent second data and said error detection correction code and reconstructs said first data by said error detection correction code.

14. A magnetic disk medium adapted to be provided in a magnetic disk apparatus including a scrambling circuit and a descrambling circuit and being subjected to operations for writing and reading information onto/from tracks on a sector unit basis by using a combination head having a write head and a read head, said disk medium comprising:

format data including first data having a data length DL which can be corrected by an error detection correction code, a first sync byte pattern arranged just before said first data second data arranged at a predetermined gap length GL from said first data, second sync byte data arranged just before said second data, and said error detection correction code arranged subsequently to said second data;

wherein said first data, said second data, and said error detection correction code are written scrambled onto said disk medium by the scrambling circuit which turns on a scrambling operation by a detection of said first sync byte pattern of said format data, subsequently turns off the scrambling operation at an elapsed timing of said data length DL, again turns on the scrambling operation at a next elapsed timing of said gap length GL, and subsequently turns off the scrambling operation at a sector end timing after said error detection correction code, and said first data and said second data are adapted to be demodulated when said first sync byte pattern is detected at the time said sector region is read, and said second data is adapted to be demodulated when said first sync byte pattern is not detected but said second sync byte pattern is detected, so that said first data can be reconstructed using said error detection correction code.

15. A medium according to claim 14, wherein a data length of said first data arranged subsequently to said first sync byte pattern is equal to or larger than a length of a defect which is caused due to a thermal asperity of the read head with the medium and is equal to or less than a length of data which can be corrected by said error detection correction code.

16. A medium according to claim 14, wherein said first and second sync byte patterns are different or same patterns.

17. A medium according to claim 14, wherein a training pattern to automatically adjust a circuit constant of an automatic equalizer to an optimum value has been written to a position before each of said first and second sync byte patterns.

18. A medium according to claim 14, wherein a pilot pattern to synchronize a clock generating circuit provided for a reading unit with a read signal has been written to a position before each of said first and second sync byte patterns.

19. A magnetic disk apparatus for writing and reading format data onto/from tracks of a medium on a sector unit basis by using a combination head having a write head and a read head, the format data including first data having a data length DL which can be corrected by an error detection correction code, a first sync byte pattern arranged just before the first data second data arranged at a predetermined gap length GL from the first data, second sync byte data arranged just before the second data, and said error detection correction code arranged subsequently to the second data, said apparatus comprising:

a reading unit for reading out the format data and demodulating first data and the second data in the case where the first sync byte pattern is detected, demodulating the second data and a error detection correction code in the case where the first sync byte pattern is not detected but the second sync byte pattern is detected, and reconstructing the first data using the error detection correction code; and a descrambling circuit provided for said reading unit and constructed in such a manner that in the case where the first sync byte pattern of the format data is detected, a descrambling operation is turned on at the time of said detection and turned off at the elapsed timing of the data length DL, the descrambling operation being subsequently again turned on at the elapsed timing of the gap length GL and turned off at the sector end timing after the error detection correction code, thereby descrambling each of the first data, the second data, and the error detection correction code which are included in the write format data, and in the case where the first sync byte pattern of the format data is not detected but the second sync byte pattern is detected, the descrambling operation is turned on at the time of said detection and turned off at the sector end timing after the error detection correction code, thereby descrambling each of the second data and the error detection correction code which are included in the write format data.

* * * * *

UNITED STATES PATENT AND TRADEMARK OFFICE
CERTIFICATE OF CORRECTION

Page 1 of 1

PATENT NO.    : 6,191,902 B1
DATED         : February 20, 2001
INVENTOR(S)   : Hashimura et al.

It is certified that error appears in the above-identified patent and that said Letters Patent is hereby corrected as shown below:

Column 24,
Line 44, insert -- , -- (a comma) between "data" and "second".
Line 66, delete "date" and insert -- data -- therefor.

Column 25,
Line 34, delete " to recording" and insert -- the read -- therefor.

Column 26,
Line 38, insert -- , -- (a comma) between "data" and "second".

Column 27,
Line 19, insert -- , -- (a comma) between "data" and "second".
Line 27, delete "a" and insert -- the -- therefor.

Signed and Sealed this

Nineteenth Day of March, 2002

Attest:

JAMES E. ROGAN
*Director of the United States Patent and Trademark Office*

*Attesting Officer*